(12) United States Patent
Kilickiran et al.

(10) Patent No.: US 8,501,284 B2
(45) Date of Patent: *Aug. 6, 2013

(54) BLUE PHASE LIQUID CRYSTAL COMPOSITION

(75) Inventors: Pinar Kilickiran, Stuttgart (DE); David Danner, Stuttgart (DE); Zakir Hussain, Stuttgart (DE); Nadine Hollfelder, Rutesheim (DE); Gabriele Nelles, Stuttgart (DE)

(73) Assignee: Sony Corporation, Tokyo (JP)

( * ) Notice: Subject to any disclaimer, the term of this patent is extended or adjusted under 35 U.S.C. 154(b) by 75 days.

This patent is subject to a terminal disclaimer.

(21) Appl. No.: 13/053,832

(22) Filed: Mar. 22, 2011

(65) Prior Publication Data

US 2011/0240917 A1    Oct. 6, 2011

(30) Foreign Application Priority Data

Mar. 31, 2010 (EP) ..................................... 10003616
Aug. 4, 2010 (EP) ..................................... 10008144

(51) Int. Cl.
*C09K 19/52* (2006.01)
*C09K 19/54* (2006.01)
*C09K 19/06* (2006.01)

(52) U.S. Cl.
USPC .................... 428/1.1; 252/299.01; 252/299.5; 252/299.6

(58) Field of Classification Search
USPC ............. 428/1.1; 252/299.01, 299.6, 299.63, 252/299.67, 299.5
See application file for complete search history.

(56) References Cited

U.S. PATENT DOCUMENTS

| | | | |
|---|---|---|---|
| 2005/0185131 A1* | 8/2005 | Miyachi et al. | 349/167 |
| 2009/0322997 A1* | 12/2009 | Kaihoko et al. | 349/117 |
| 2010/0103366 A1* | 4/2010 | Farrand et al. | 349/183 |
| 2011/0240920 A1* | 10/2011 | Kilickiran et al. | 252/299.63 |
| 2012/0138853 A1* | 6/2012 | Kubota et al. | 252/299.64 |

FOREIGN PATENT DOCUMENTS

WO    WO 2005080529 A1 *   9/2005

OTHER PUBLICATIONS

Extended European Search Report issued Jan. 21, 2013, in European Patent Application No. 11002228.2.
Takashi Iwata, et al., "A method for enlarging the Kerr constant of polymer-stabilised blue phases", Liquid Crystals, XP-001548736 vol. 36, No. 9, Sep. 2009, pp. 947-951.

* cited by examiner

*Primary Examiner* — Shean C Wu
(74) *Attorney, Agent, or Firm* — Oblon, Spivak, McClelland, Maier & Neustadt, L.L.P.

(57) ABSTRACT

The present invention relates to a blue phase (BP) liquid crystal composition and to a method of stabilizing a blue phase state of a liquid crystal material. Furthermore, the present invention relates to a method of lowering the operating voltage of a liquid crystal material. Moreover, the present invention relates to a blue phase crystal material stabilized by the method according to the present invention or having an operating voltage that is lowered by the method according to the present invention. Also, the present invention relates to a liquid crystal cell comprising a blue phase liquid crystal material and to a liquid crystal display comprising a blue phase liquid crystal material. The present invention furthermore relates to a method of broadening that stability temperature range of a liquid crystal material in its blue phase state.

19 Claims, 14 Drawing Sheets

BLUE PHASE LIQUID CRYSTAL COMPOSITION

CROSS-REFERENCES TO RELATED APPLICATIONS

This application is based upon and claims the benefit of priority to European Application Nos. 10003616.9 and 10008144.7 filed on Mar. 31, 2010 and Aug. 4, 2010, respectively.

BACKGROUND OF THE INVENTION

The present invention relates to a blue phase (BP) liquid crystal composition and to a method of stabilizing a blue phase state of a liquid crystal material. Furthermore, the present invention relates to a method of lowering the operating voltage of a liquid crystal material. Moreover, the present invention relates to a blue phase liquid crystal material stabilized by the method according to the present invention or having an operating voltage that is lowered by the method according to the present invention. Also, the present invention relates to a liquid crystal cell comprising a blue phase liquid crystal material and to a liquid crystal display comprising a blue phase liquid crystal material. The present invention furthermore relates to a method of broadening the stability temperature range of a liquid crystal material in its blue phase state.

Liquid crystalline blue phases are self-assembled cubic structures which are composed of helically double twisted cylinders. This type of structure is limited to a very narrow temperature range of approximately 1-2° C. To make use of such liquid crystalline blue phases in display applications, the blue phase (BP) must be brought into a state where it is stable over a larger temperature range. In recent years, based on the work of Kikuchi et al., ways have been found to extend the temperature range of blue phase liquid crystals to more than 60° C., wherein the blue phase is stabilized by the help of a polymer network. Coles et al. developed novel bimesogenic materials which yielded temperature ranges of approximately 50° C. over which the blue phase state of a liquid crystal material exists.

A liquid crystalline blue phase is an optically isotropic phase which, upon application of an electric field and based on the Kerr effect, becomes birefringent, and, due to the refractive index distribution of the liquid crystal, turns into an optically anisotropic state which is unlike other liquid crystal phases which are switching from one anisotropic state to another. If the blue phase is brought between two crossed polarizers, the transmittance increases with increase of the voltage. This operation requires application of a considerable voltage as it links up to the induced birefringence which itself is highly dependent on the Kerr constant of the liquid crystal material and also on the strength of the electric field. Although the broadening of the stability temperature range of a blue phase liquid crystal material represents an advancement, there are still drawbacks associated with blue phase liquid crystal materials, such as the high operating voltage which needs to be applied to make the blue phase switch from a dark to a bright state, a relatively low transmittance and the fact that the temperature ranges are still not wide enough for practical applications in displays. Different approaches have been taken to improve the above-mentioned aspects, such as for example by means of an optimization of the electrode structure, a tuning of the liquid crystal and chiral materials, an improvement of the polymer network by using multifunctional monomers (see also reference 1-6).

1. H. Kikuchi, M. Yokota, Y. Hisakado, H. Yang, T. Kajiyama; Nature materials, Vol. 1, 64-68, 2002.
2. H. Coles, M. Pivnenko, Nature, 436, 18, 997-1000, 2005.
3. T. Iwata, K. Suzuki, N. Amaya, H. Higuchi, H. Masunaga, S. Sasaki, H. Kikuchi, Macromolecules, 42, 2002-2008, 2009.
4. Z. Ge, L. Rao, S. Gauza, S.-T. Wu, J. Display Technol., Vol. 5, No. 7, 250-256, 2009
5. H.-S. Kitzerow, Chem Phys Chem 7, 63-66, 2006
6. S. Meiboom, J. P. Sethna, W. P. Anderson, W. F. Brinkman, Phys. Rev. Lett., Vol. 46, 1216-1219, 1981

Current electronic device display technologies require displays with high brightness and contrast, low power consumption and very fast response times for application fields such as three-dimensional displays or field sequential displays. Incorporating liquid crystalline blue phase materials into displays offers the potential to meet several of these requirements, but still the issues of stability of these blue phases and operating voltage of such blue phase liquid crystal materials need to be resolved. Accordingly, it was an object of the present invention to provide for means to increase the stability of blue phase liquid crystal materials. It was also an object of the present invention to provide for means to lower the operating voltage of blue phase liquid crystal materials.

BRIEF SUMMARY OF THE INVENTION

The objects of the present invention are solved by a liquid crystal composition comprising:
  a liquid crystal material capable of forming a blue phase
  at least one crosslinking monomer having at least one alkyl side chain.

In one embodiment, said composition further comprises an endcapping monomer, preferably having an alkyl side chain, more preferably an alkyl side chain having at least 7 carbon atoms.

In one embodiment, said at least one alkyl side chain on said crosslinking monomer has the formula $C_pH_{2p+1}$, wherein p is selected from 1 to 20, preferably 3 to 20, more preferably 6 to 20, even more preferably 8 to 20, even more preferably 10 to 20, even more preferably 11 to 20, and wherein said alkyl side chain, if present on said endcapping monomer has the formula $C_pH_{2p+1}$, wherein p is selected from 7 to 20, preferably 10 to 20, even more preferably 11 to 20.

In one embodiment, said at least one crosslinking monomer is one or several of the following:

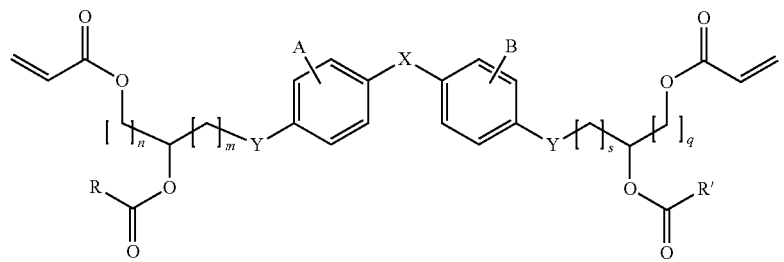
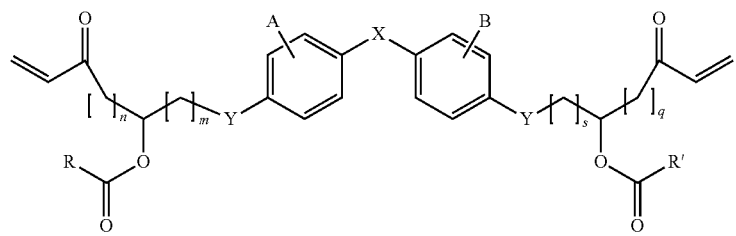
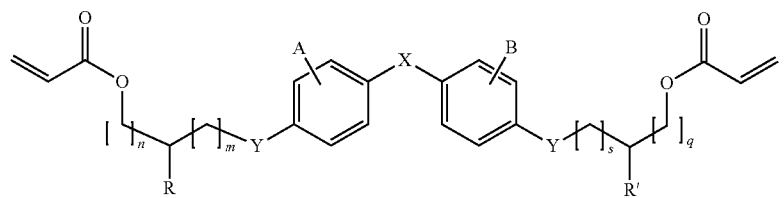
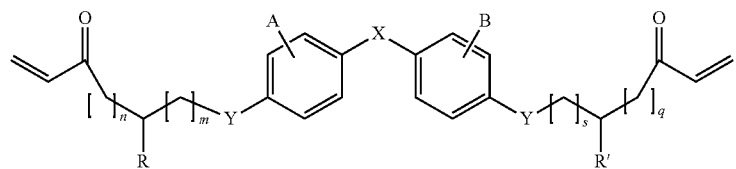
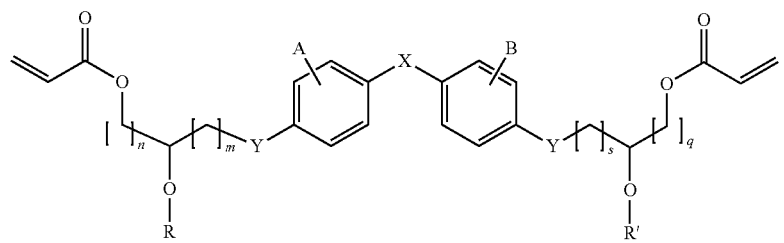
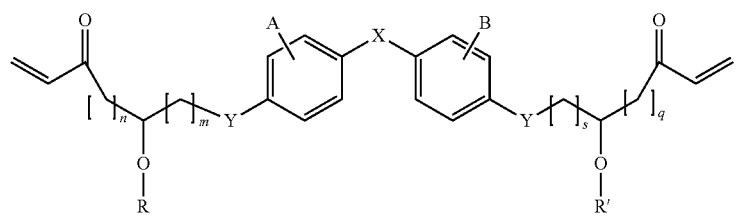
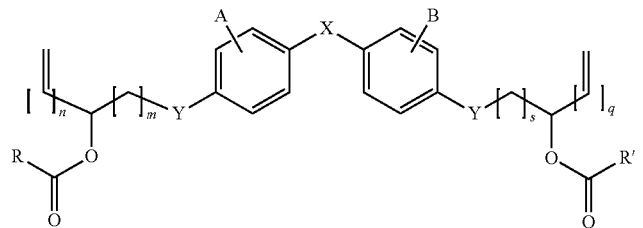

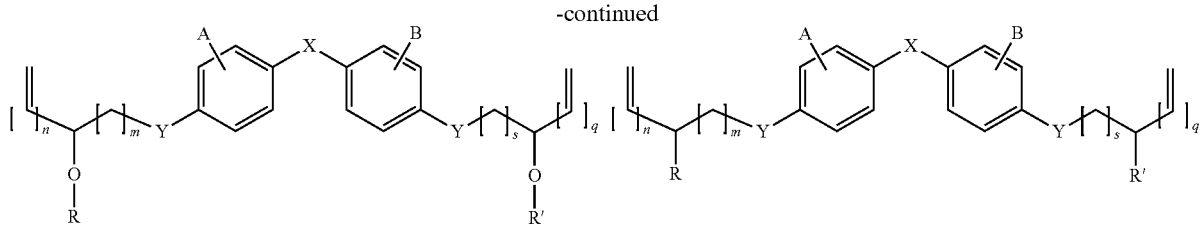

wherein X is either one of: $C_tH_{2t}$ (t=0 to 20), O, S, NR" (R"=H, $C_rH_{2r+1}$, r=1 to 20), $C(CF_3)_2$, CHF, $CF_2$, $C(C_rH_{2r})_2$ (r=1 to 20), —C(O)O, C(O), OC(O)O, aromatic rings such as phenyl, napthyl, biphenyl, 5 or 6 membered heteroaromatic rings such as thiophene, pyridine, —$CR_a$=$CR_b$—, wherein $R_a$ & $R_b$ are independently selected from H, $C_rH_{2r+1}$, F, Cl, CN, $CF_3$, ester), —C≡C—.

where R and R' are independently at each occurrence selected from $C_pH_{2p+1}$, wherein p=1 to 20, preferably 3 to 20, where n, m, s and q=0 to 20, preferably 0 to 10 where Y is selected from $CH_2$, O, C(O)O, OC(O), OC(O)O, S, NH, NR", wherein R"=H, $C_rH_{2r+1}$, r=1 to 20, where A and B are independently at each occurrence selected from H, $C_rH_{2r+1}$, wherein r=1 to 20, F, Cl, Br, CN, $CF_3$, OH;

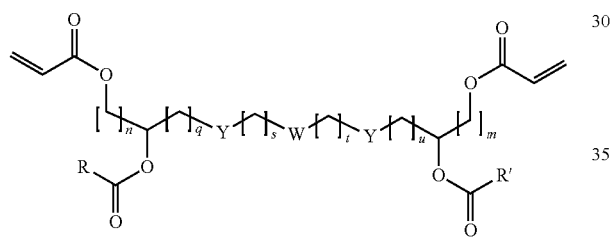

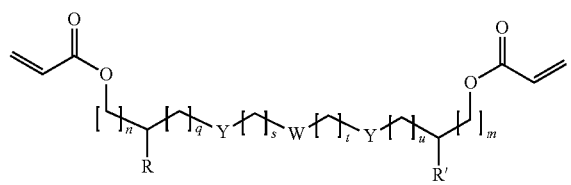

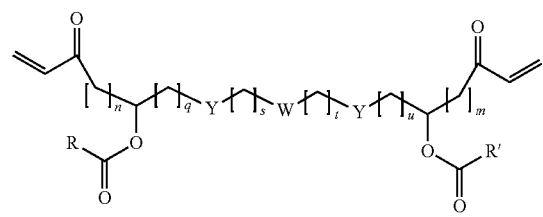

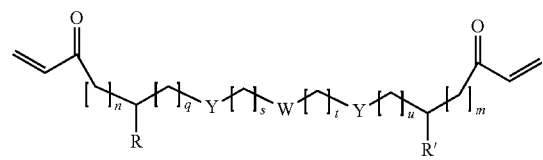

wherein W is either one of: $C_zH_{2z}$, (z=0 to 20), O, S, NR" (R"=H, $C_rH_{2r+1}$, r=1 to 20), $C(CF_3)_2$, CHF, $CF_2$, $C(C_rH_{2r})_2$, wherein r=1 to 20, —C(O)O, C(O), OC(O)O, aromatic rings such as phenyl, napthyl, biphenyl, 5 or 6 membered heteroaromatic rings such as thiophene, pyridine, —$CR_a$=$CR_b$—, wherein $R_a$ & $R_b$ are independently selected from H, $C_rH_{2r+1}$, F, Cl, CN, $CF_3$, ester), and —C≡C—.

where R and R' are independently at each occurrence selected from $C_pH_{2p+1}$, wherein p=1 to 20, preferably 3 to 20, where n, m, s, q, t and u=0 to 20, preferably 0 to 10 where Y is selected from $CH_2$, O, C(O)O, OC(O), OC(O)O, S, NH, NR", wherein R"=H, $C_rH_{2r+1}$, r=1 to 20;

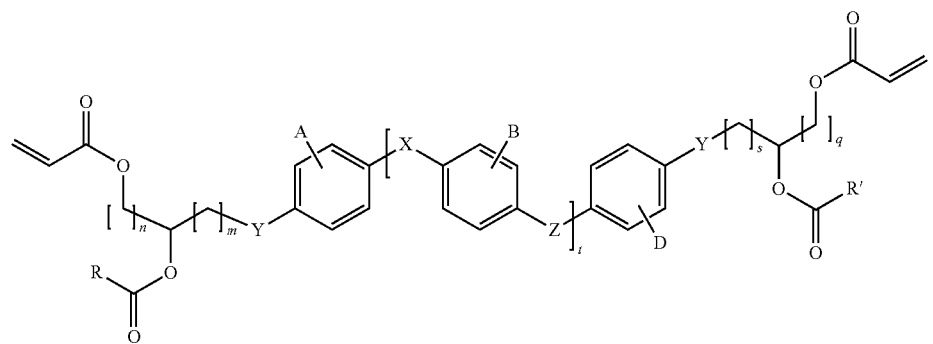
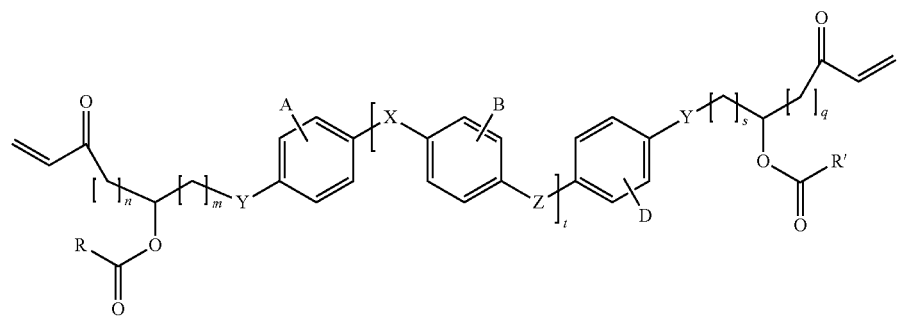
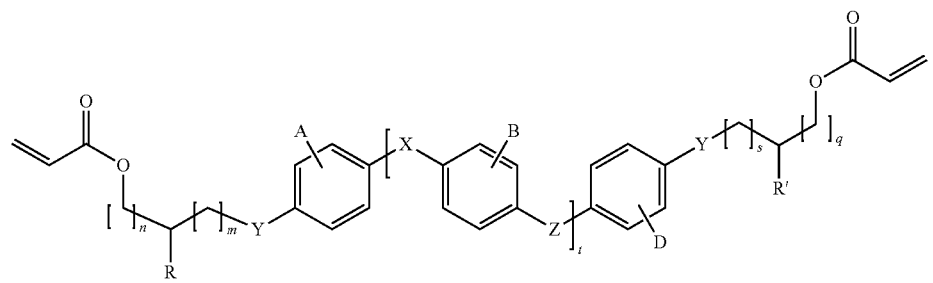
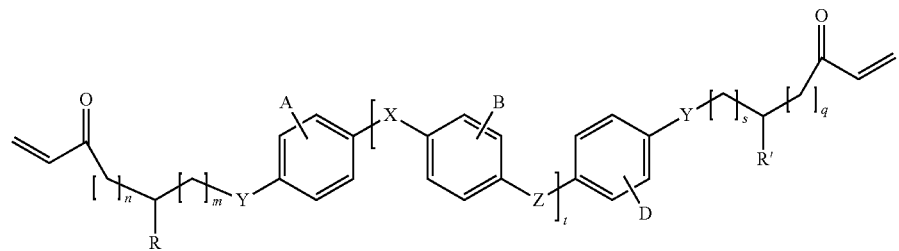

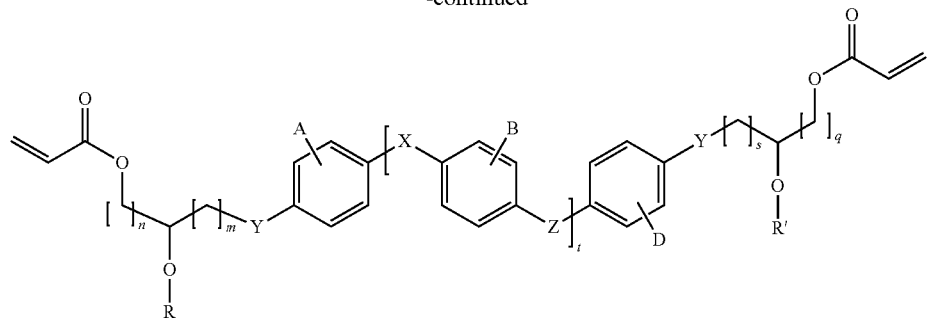

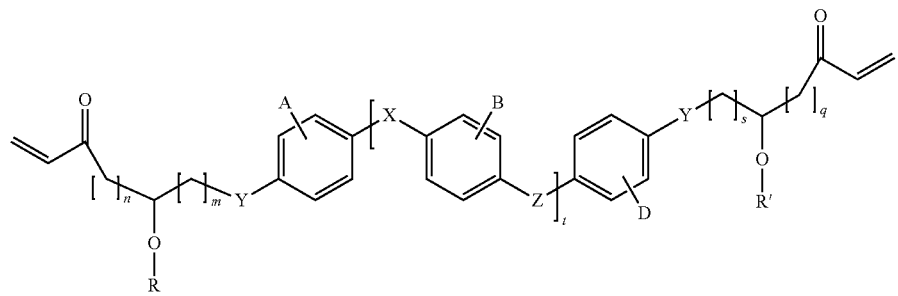

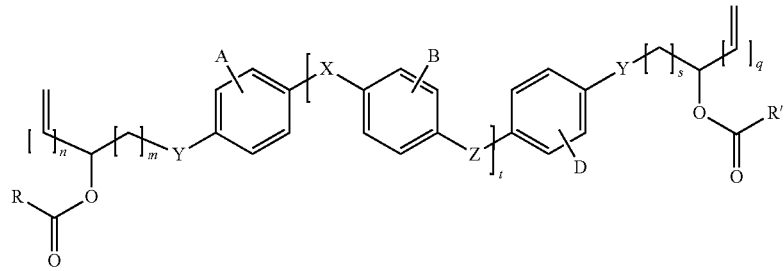

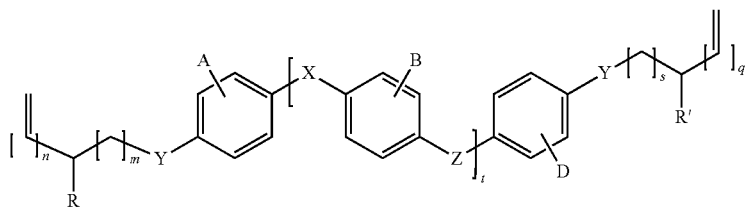

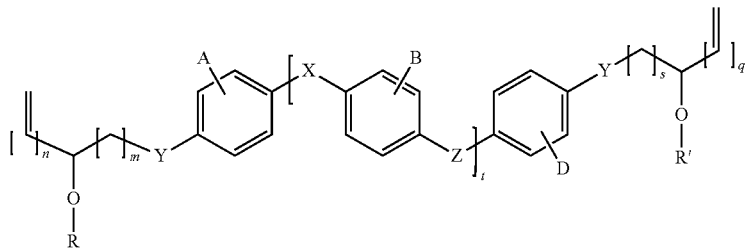

wherein X and Z are independently at each occurrence either one of: $C_yH_{2y}$ (y=0 to 20), O, S, NR" (R"=H, $C_rH_{2r+1}$, r=1 to 20), $C(CF_3)_2$, CHF, $CF_2$, $C(C_rH_{2r})_2$ (r=1 to 20), —C(O)O, C(O), OC(O)O, aromatic rings such as phenyl, napthyl, biphenyl, 5 or 6 membered heteroaromatic rings such as thiophene, pyridine, —$CR_a$=$CR_b$—, wherein $R_a$ & $R_b$ are independently selected from H, $C_rH_{2r+1}$, F, Cl, CN, $CF_3$, ester), and —C≡C—.

where R and R' are independently at each occurrence selected from $C_pH_{2p+1}$, wherein p=1 to 20, preferably 3 to 20, where n, m, s, q and t=0 to 20, preferably 0 to 10 where Y is selected from $CH_2$, O, C(O)O, OC(O), OC(O)O, S, NH, NR", wherein R"=H, $C_rH_{2r+1}$, r=1 to 20, where A, B and D are independently at each occurrence selected from H, $C_rH_{2r+1}$, wherein r=1 to 20, F, Cl, Br, CN, $CF_3$, OH; and

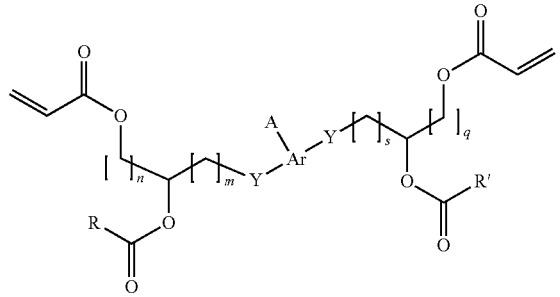

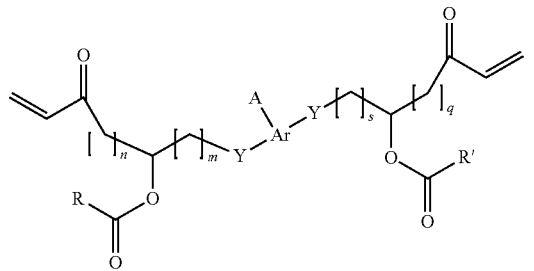

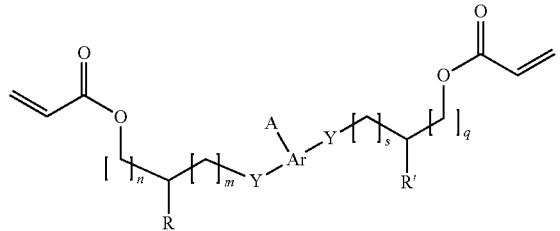

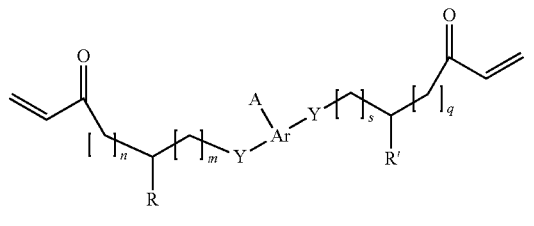

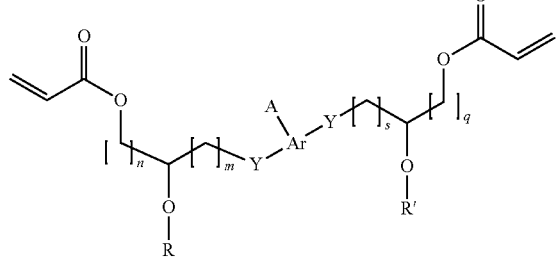

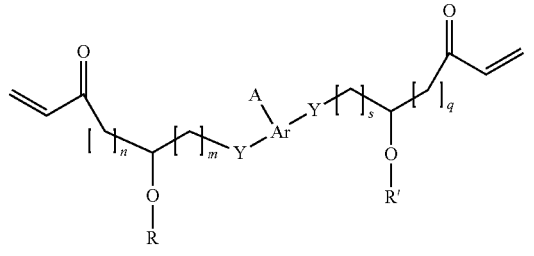

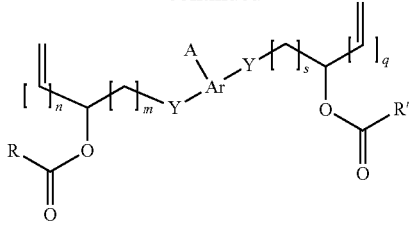

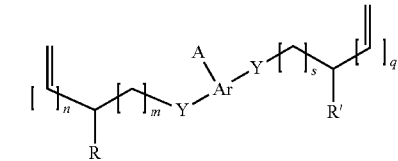

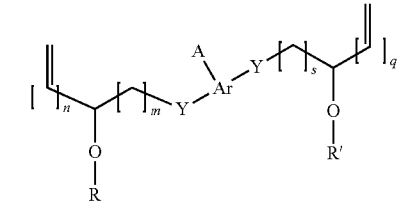

wherein Ar is selected from an aromatic ring such as phenyl, naphthyl, or from a 5 or 6 membered aromatic ring such as thiophene, pyridine, where R and R' are independently at each occurrence selected from $C_pH_{2p+1}$, wherein p=1 to 20, preferably 3 to 20, where n, m, s and q=0 to 20, preferably 0 to 10 where Y is selected from $CH_2$, O, C(O)O, OC(O), OC(O)O, S, NH, NR" (R"=H, $C_rH_{2r+1}$, r=1 to 20)

where A is selected from H, $C_rH_{2r+1}$, wherein r=1 to 20, F, Cl, Br, CN, $CF_3$, OH and is attached to any carbon atom on the aromatic ring Ar.

In one embodiment, said at least one polymerizable monomer is selected from the group comprising:

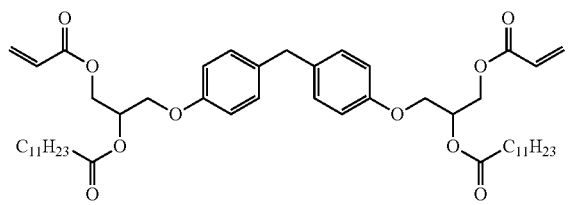

M4

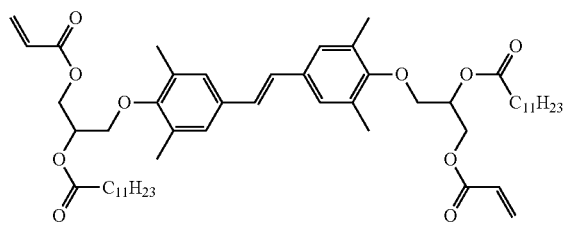

M7

In one embodiment, said liquid crystal material capable of forming a blue phase is a mixture of liquid crystal compounds.

In one embodiment, said polymerizable monomer for crosslinking is selected from diacrylate monomers, such as RM257®, and other monomers having polymerizable moieties at both ends of the monomer molecule, such as divinyl monomers.

The objects of the present invention are also solved by a method of stabilizing a blue phase state of a liquid crystal material capable of forming a blue phase and/or of broadening the temperature range over which a blue phase state of a liquid crystal material capable of forming a blue phase is stable, or a method of lowering the operating voltage of a liquid crystal material capable of forming a blue phase, said method comprising:

adding to said liquid crystal material capable of forming a blue phase at least one crosslinking monomer having at least one alkyl side chain, and, optionally, further at least one monomer for endcapping, said crosslinking monomer having at least one alkyl side chain and said endcapping monomer and said liquid crystal material capable of forming a blue phase, being as defined further above;

inducing polymerization of said polymerizable monomer(s), under conditions where a blue phase state of said liquid crystal material exists.

The objects of the present invention are also solved by a blue phase liquid crystal composition stabilized by the method of the present invention or having a stability temperature range which has been broadened by the method of the present invention or having an operating voltage that is lowered by the method of the present invention.

The objects of the present invention are also solved by a liquid crystal cell comprising a blue phase liquid crystal composition according to the present invention.

The objects of the present invention are also solved by a liquid crystal display comprising a blue phase liquid crystal composition according to the present invention or a liquid crystal cell according to the present invention.

In one embodiment, the liquid crystal material capable of forming a blue phase is a mixture of liquid crystalline compounds.

In one embodiment, the liquid crystal composition additionally comprises a photo initiator, such as 2,2-dimethoxy-2-phenyl acetophenone (DMPAP).

In one embodiment the liquid crystal material capable of forming a blue phase is a mixture comprising the following: a nematic mixture, such as JC-1041XX®, a further liquid crystalline compound, such as 4-cyano 4'-pentyl biphenyl (5CB®), and a chiral dopant, such as ZLI-4572®.

In one embodiment, a liquid crystal composition in accordance with the present invention has the following concentrations:

40-48 mol % liquid crystal material or a liquid crystal mixture capable of forming a blue phase, 40-48 mol % of a further liquid crystalline compound or a liquid crystalline mixture, 0.5-15 mol % of said crosslinking monomer having at least an alkyl side chain.

DETAILED DESCRIPTION OF THE INVENTION

Figure 1:
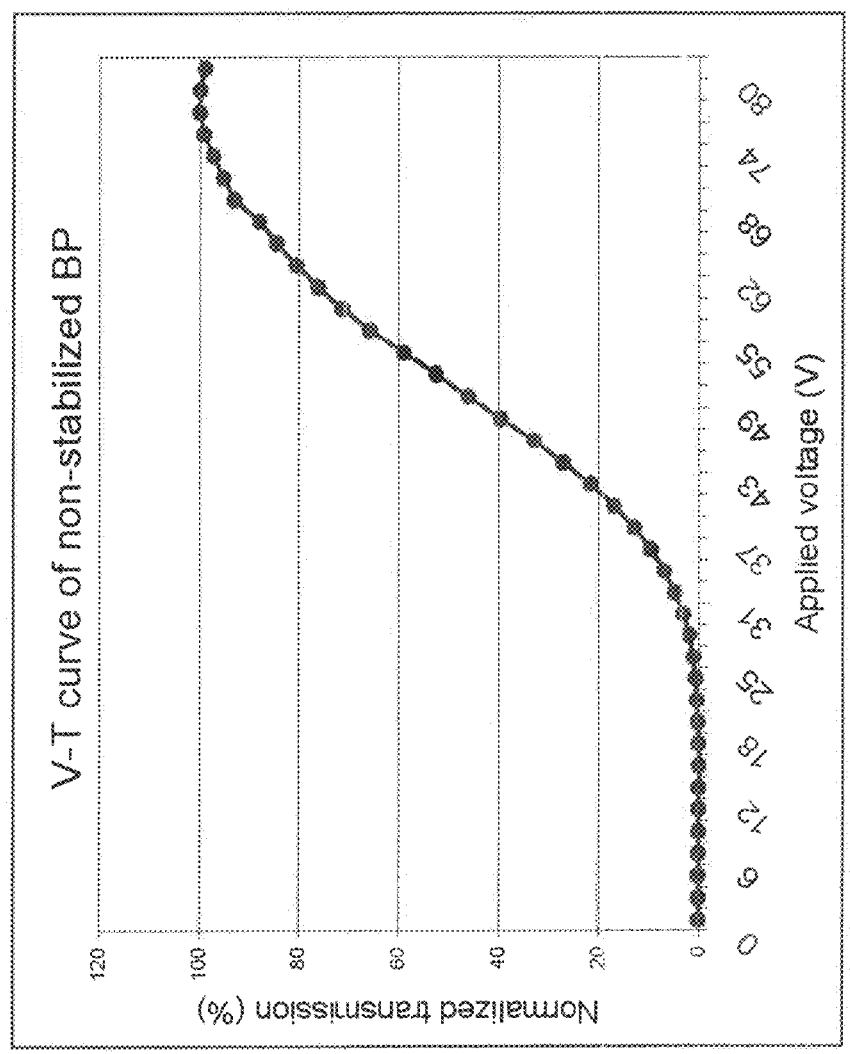
FIG. 1 shows a voltage-transmission curve of a non-stabilized blue phase liquid crystal
composition at 80V operating voltage.

It should be understood that in the above recited exemplary composition, the total should make up 100 mol %. If the afore-mentioned constituents make up less than 100 mol %, there may, of course, also be additional components present, such as one or several chiral dopant materials, preferably in the range up from 1-6 mol %, photo initiators, preferably in the range of 0.1-2 mol % and further polymerizable monomers for endcapping and/or crosslinking, preferably in the range of from 0.5 to 8 mol %.

As used herein, the term "blue phase" is meant to refer to a state of a liquid crystal material or composition, wherein double twist structures occur over extended dimensions. In one embodiment, such blue phase state is a self-assembled three-dimensional cubic defect structure of a liquid crystal material/composition.

A liquid crystal material capable of forming a blue phase, as used herein, is a liquid crystal material which, under defined conditions, may form such blue phase. Typically, this is a defined temperature range. A person skilled in the art will be able to determine and identify liquid crystal materials capable of forming a blue phase. In one embodiment, such liquid crystal material is a positive type nematic liquid crystal material which additionally includes a chiral dopant material. Such liquid crystal material may also be a mixture of various liquid crystal compounds. Blue phase liquid crystal materials are also commercially available from a variety of sources. A commercially available example of a blue phase liquid crystal material is JC-1041xx®, which is a mixture of various positive type nematic liquid crystal compounds. An example of a chiral dopant material is ZLI-4572®.

In accordance with the present invention, the liquid crystal material capable of forming a blue phase is a mixture of liquid crystalline compounds and one or more chiral materials. A person skilled in the art will be able to determine whether or not a liquid crystal mixture forms a blue phase, by simply raising the temperature of the liquid crystal material and subsequently lowering it again under defined conditions and measuring or observing the light transmission during the phase transition from the isotropic phase to a chiral nematic phase or vice versa.

The term "5CB®" refers to 4-cyano 4'-pentyl biphenyl.

The term "crosslinking monomer" and "monomer for crosslinking", as used herein, is meant to refer to a monomer which has at least two chemical functionalities which allow this monomer to polymerize or crosslink in a polymerization reaction. Typically, a crosslinking monomer is at least bifunctional, i.e. it has at least two functional groups with which it can react in a polymerization reaction. Examples for such "crosslinking monomer" are diacrylate monomers, divinyl monomers etc. A specific commercial available example of a diacrylate monomer is RM257®. The term "endcapping monomer" or "monomer for endcapping" is meant to refer to a monomer which reacts with the polymer at its still reactive parts and by this way stops the polymerization at those sites of the polymer. Typically, an endcapping monomer is monofunctional, i.e. it has only one functional group with which it can react in a polymerization reaction. The endcapping units are used to make sure that when a polymer is obtained it no longer has reactive (polymerizable) units left which in applications such as a display can cause reliability issues.

The term "polymerizable monomer" is meant to refer to any monomer which can be polymerized. Sometimes, herein, the term is used interchangeably with a "crosslinking monomer". Such polymerization can be initiated by exposing such monomer to appropriate conditions for initiation of polymerization. Such conditions may for example be heat, irradiation with electromagnetic radiation, such as UV or UV-VIS. In a preferred embodiment, the polymerizable monomers in accordance with the present invention are UV-polymerizable monomers.

The present inventors have surprisingly found that, by including in the liquid crystal material mixture which is capable of forming a blue phase, at least one crosslinking monomer which has at least one alkyl side chain, it is possible to stabilize the blue phase state of the liquid crystal material, if the crosslinking monomer having at least one alkyl side chain is polymerized while the liquid crystal material is in a blue phase state. The alkyl side chain typically has 1-20 C-atoms, preferably 3-20, more preferably 6-20, more preferably 8-20, even more preferably 10-20 and even more preferably 11 to 20. In accordance with the present invention and without wishing to be bound by any theory, the present inventors believe that the alkyl side chains of the crosslinking monomers are incorporated into the defects which are present in the cubic structure of the blue phase. In doing so, a flexibility is induced in the blue phase system which results in such system being switched at lower operating voltages. The alkyl chains of the crosslinking monomers are believed to make the blue phase system more stable and flexible at the same time, and therefore, a blue phase system having such polymer with alkyl side chains is capable of reacting faster to an applied electric field. This, in turn, will lead to a decrease of the operating voltage of the system.

Figure 2:
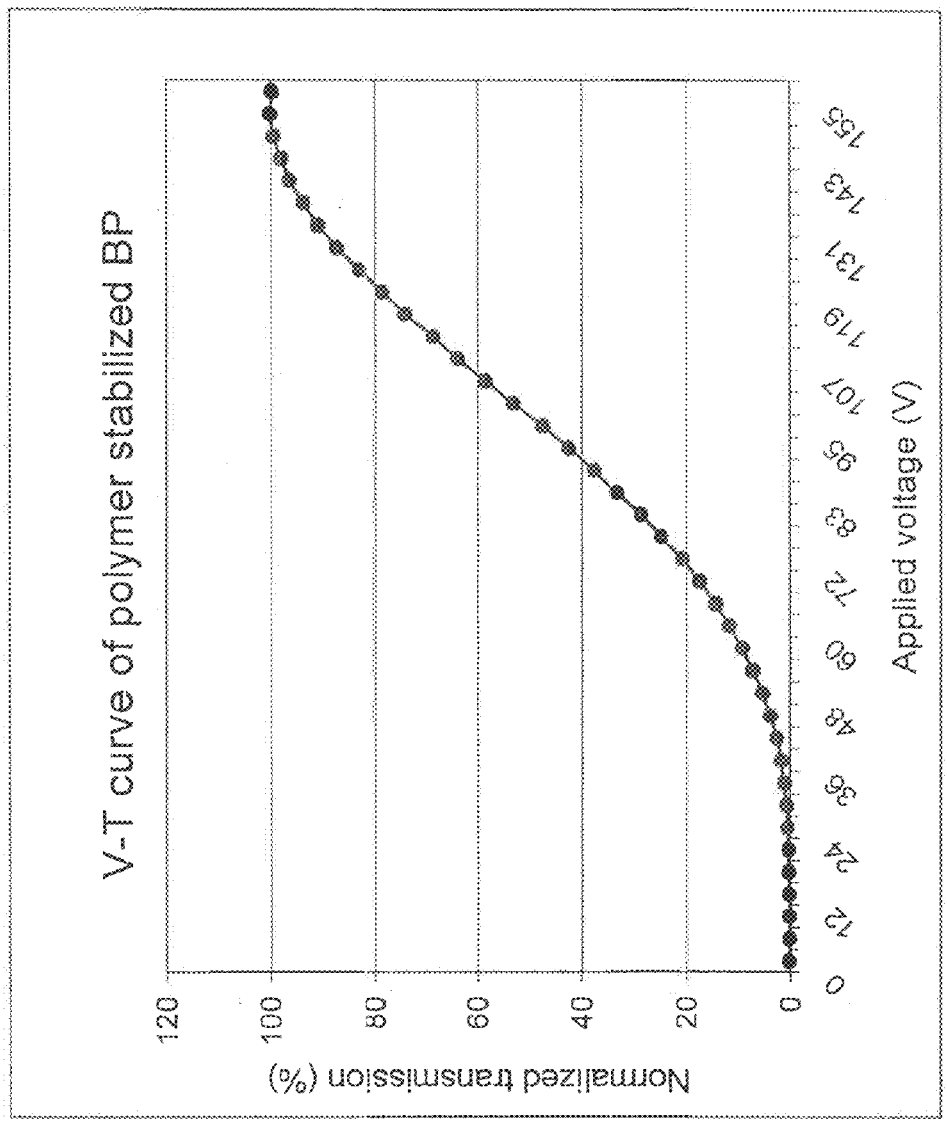
FIG. 2 shows a voltage-transmission curve of a polymer-stabilized blue phase liquid crystal
composition at over 140V operating voltage.

It appears that the polymer network formed by polymerization, such as UV-polymerization of the monomers, which are admixed to a blue phase liquid crystal composition, plays a very important role on the stability temperature range of the blue phase. Furthermore, the polymer network also appears to have a very important role in the response properties of the liquid crystal materials to an applied electric field. Taking a non-stabilized blue phase temperature range of a standard literature mixture which range is approximately 2° C. at an operating voltage of 80 V, a polymer stabilization of the same blue phase liquid composition results in an extended temperature range over 60° C. and a much higher operating voltage, namely 140V (see also FIGS. 1 and 2).

The present inventors have found that by incorporating alkyl side chains of crosslinking monomers into a blue phase liquid crystal composition, the polymer backbone stabilizes the self-assembled cubic organization of the blue phase. At the same time, the alkyl side chains of the polymer are believed to be incorporated into the defect structure of the blue phase and around the blue phase helices, and hence, they will affect the stability as well as the switching behavior of the blue phase liquid crystal composition. The alkyl side chains are also believed to have direct molecular interactions, such as van der Waals-interactions with the liquid crystal molecules.

In a preferred embodiment, the alkyl side chain has a length of 3 to 20 carbon atoms. In one embodiment, the length of the alkyl side chains is 8 to 20 carbon atoms. In one embodiment, the length of the alkyl side chain is 10 to 20 carbon atoms. In a further embodiment, the length of the alkyl side chain is 11 to 20 carbon items.

In the following, reference is made to the figures, wherein
Moreover, reference is made to the following examples which are given to illustrate, not to limit the present invention:

EXAMPLES

Example 1

Synthesis

Synthesis of Monomer M1

Figure 6:
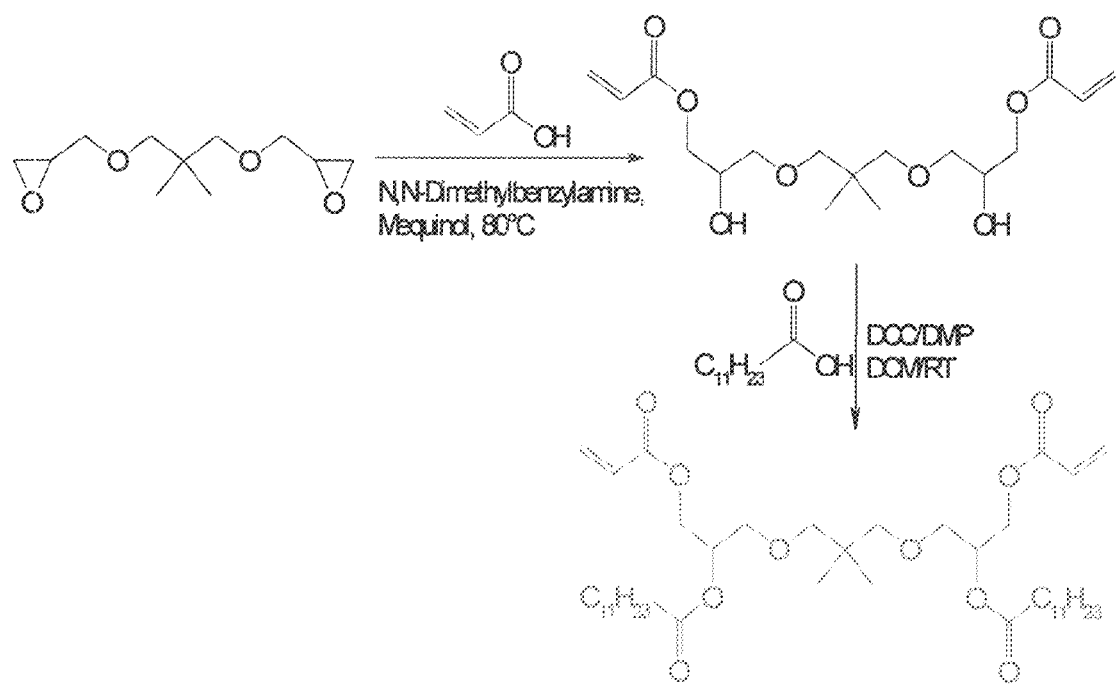
FIG. 6 shows an exemplary synthesis of monomer M1.

Synthetic scheme for the synthesis of monomer M1 is given in FIG. 6. Neopentyl glycol diglycidyl ether used as the starting material was first purified through chromatography since technical grade obtained from Sigma Aldrich was only 50-65% pure. In a typical procedure, 6.0 g (28 mmol) neopentyl glycol diglycidyl ether; 4.0 g (56 mmol) acrylic acid; 50 mg N,N-dimethyl benzylamine and 10 mg p-methoxy phenol (mequinol) were heated at 80° C. under argon atmosphere and the temperature was increased slowly to 100° C. After 4 h a gel-like product was obtained which was sparingly soluble in all solvents. The product obtained with impure starting material was extracted with toluene and the combined extracts were concentrated and purified by silica gel column (ether/pentane). NMR data confirmed the structure as diacrylate diol intermediate.

For the synthesis of monomer M1, esterification of the above synthesized diol was carried out. 80 mg (0.23 mmol) diacrylate diol, 92 mg (0.46 mmol) lauric acid, 4 mg dimethylamino-pyridine were added to 4 ml anhydrous dichloromethane. The mixture was cooled down to 0° C. and 94 mg (0.46 mmol) dicyclohexyl carbodiimide (DCC) were added. After stirring at 0° C. for 5 minutes, ice bath was removed and the mixture was stirred at room temperature for 3 hours. Precipitated urea was filtered off and the solvent was removed under reduced pressure. The residue was taken up in dichloromethane and further precipitated urea was filtered off again. The organic layer was washed with 0.1N HCl and saturated sodium hydrogen carbonate solution and dried over magnesium sulfate. Solvent was removed under reduced pressure and monomer M1 was purified by silica gel column using a pentane/ether mixture and adding 1% of triethylamine. Chromatography without triethylamine leads to the decomposition of compound and the remaining compound was always sticking on the column. Monomer M1 was identified by its NMR.

Synthesis of Monomer M2

Figure 7:
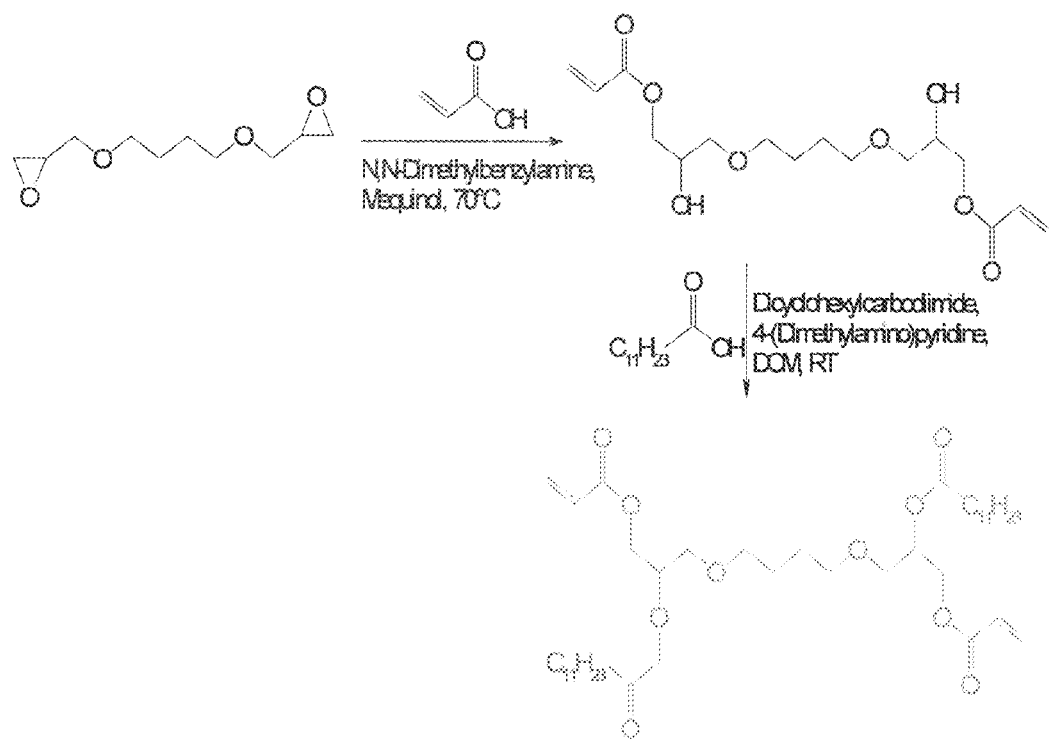
FIG. 7 shows an exemplary synthesis of monomer M2.

Synthetic scheme for the synthesis of monomer M2 is given in FIG. 7. In a typical procedure, 500 mg (2.5 mmol) 1,4-butanediol diglycidyl ether; 360 mg (5 mmol) acrylic acid; 5 mg N,N-dimethyl benzylamine and 1 mg p-methoxy phenol (mequinol) were stirred at 70° C. under argon atmosphere. With increasing reaction time, the reaction mixture became more viscous. After 7 hours the reaction was stopped and the mixture was separated over silica gel column by eluting with diethylether as eluent to obtain two different products i.e. mono- and di-acrylate which were identified by their respective NMR data.

Following the synthesis, diacrylate diol was subjected to esterification where dicyclohexyl carbodiimide (7.4 mmol) was added to a mixture of diacrylate (3.7 mmol), lauric acid (7.4 mmol) and 4-dimethylamino pyridine (0.25 mmol) in 10 ml of anhydrous dichloromethane in an ice bath. Reaction mixture was stirred at room temperature for 5 h and the precipitated urea was filtered off and washed with dichloromethane. Solvent was removed under reduced pressure and newly precipitated urea was again filtered off. The solution was washed with 0.5 N HCl, twice with sat. NaHCO$_3$ and dried over MgSO$_4$. Final purification was carried out by silica gel column chromatography with pentane/ether mixture as eluents and adding 1% of triethylamine. Structure of the purified monomer M2 was confirmed by NMR.

Synthesis of Monomer M3

Figure 8:
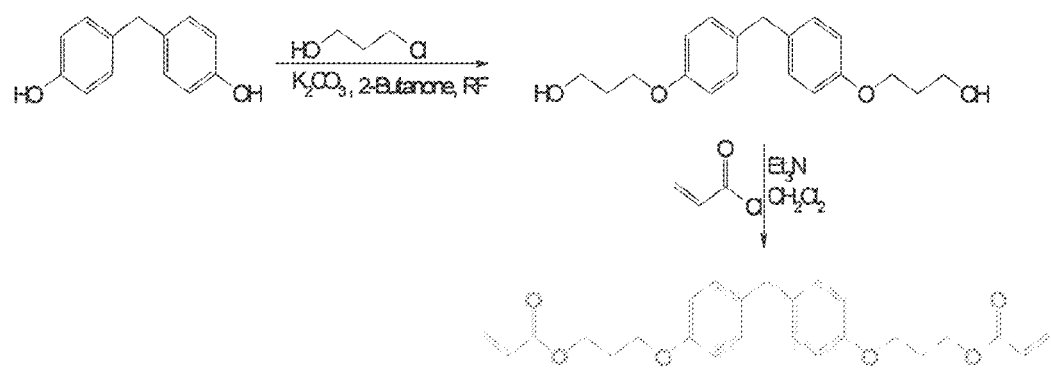
FIG. 8 shows an exemplary synthesis of monomer M3.

Synthetic scheme for the synthesis of monomer M3 is given in FIG. 8. In a typical procedure, 2.5 mmol bis(4-hydroxyphenyl)-methane, 10 mmol 3-chloro-1-propanol (excess) & 10 mmol potassium carbonate were stirred in 10 ml 2-butanone under reflux for about 27 hours. After cooling, the mixture was filtered and the filtrate was concentrated under reduced pressure. The mixture was separated over silica gel column with ether/pentane (7:3 to pure ether) and finally acetone as solvents to obtain 400 mg (50%) of pure product (diol) which was characterized through its NMR & GC-MS analyses.

Following the synthesis, 2.9 mmol acryloyl chloride were added dropwise to a mixture of 1.23 mmol bisphenyl methane intermediate & 3.7 mmol triethylamine in 10 ml dichloromethane on an ice bath. After stirring for 20 min. on ice bath, the mixture was stirred at room temperature for 4 hours. After completion of reaction, water was added to the mixture and the aqueous layer was extracted with dichloromethane. Organic layers were combined and washed with sat. sodium hydrogen carbonate and sodium chloride solution and dried over magnesium sulfate. Solvent was removed under reduced pressure and the mixture was purified over silica gel column by using dichloromethane/pentane (4:1) to pure dichloromethane and finally ethyl acetate/dichloromethane (1:1) as solvents. Purification yielded 400 mg of pure product (M3) as yellow oil (turned slightly yellow solid after keeping two days in the fridge). Its structure was confirmed by NMR and GC-MS analyses.

Synthesis of Monomer M4

Figure 9:
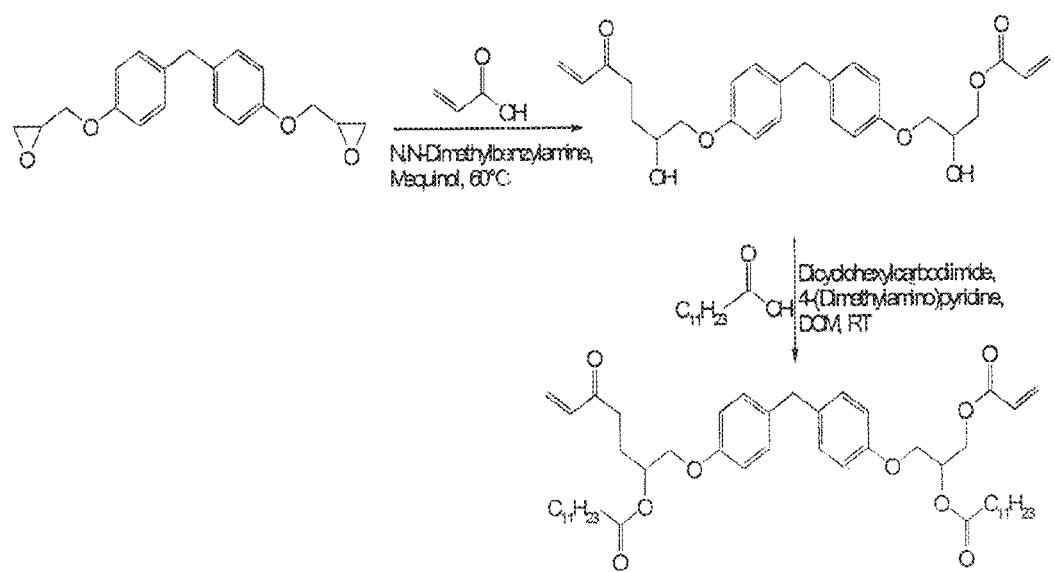
FIG. 9 shows an exemplary synthesis of monomer M4.

Synthetic scheme for the synthesis of monomer M4 is given in FIG. 9. In a typical procedure 4 mmol bis[4-(glycidyloxy)phenyl]methane, 12 mmol acrylic acid (excess), 0.07 mmol dimethylbenzyl amine and 0.0016 mmol mequinol (polymerization inhibitor) were stirred at 60° C. in an oil bath for 24 hours. The resulting mixture was a clear, colorless and very viscous liquid, which was purified directly by silica gel column with dichloromethane/ether (2:1) as solvents to obtain 1.5 g of pure product (diacrylate diol) as a highly viscous/colorless material. Its structure was confirmed by NMR & GC-MS analyses.

Following the synthesis, above obtained diol was subjected to esterification where to the 4 mmol diol (bis-[4-(2-hydroxy-3-acryloxy)-propoxy]-phenyl methane), 8 mmol lauric acid and 0.32 mmol 4-dimethylamino pyridine in 15 ml of anhydrous dichloromethane on an ice bath were added 8.0 mmol dicyclohexyl carbodiimide. The mixture was stirred for 15 min. on ice bath and then at room temperature for 6 hours. Precipitated urea was filtered off and washed with dichloromethane. Solvent was removed under reduced pressure and newly precipitated urea was again filtered off. The solution was washed with 0.5 N HCl and with sat. NaHCO$_3$ twice and dried over MgSO$_4$ to obtain 500 mg of viscous colorless liquid as monomer M4. Its structure was confirmed through NMR analysis.

Synthesis of Monomer M6 and M7

Figure 10:
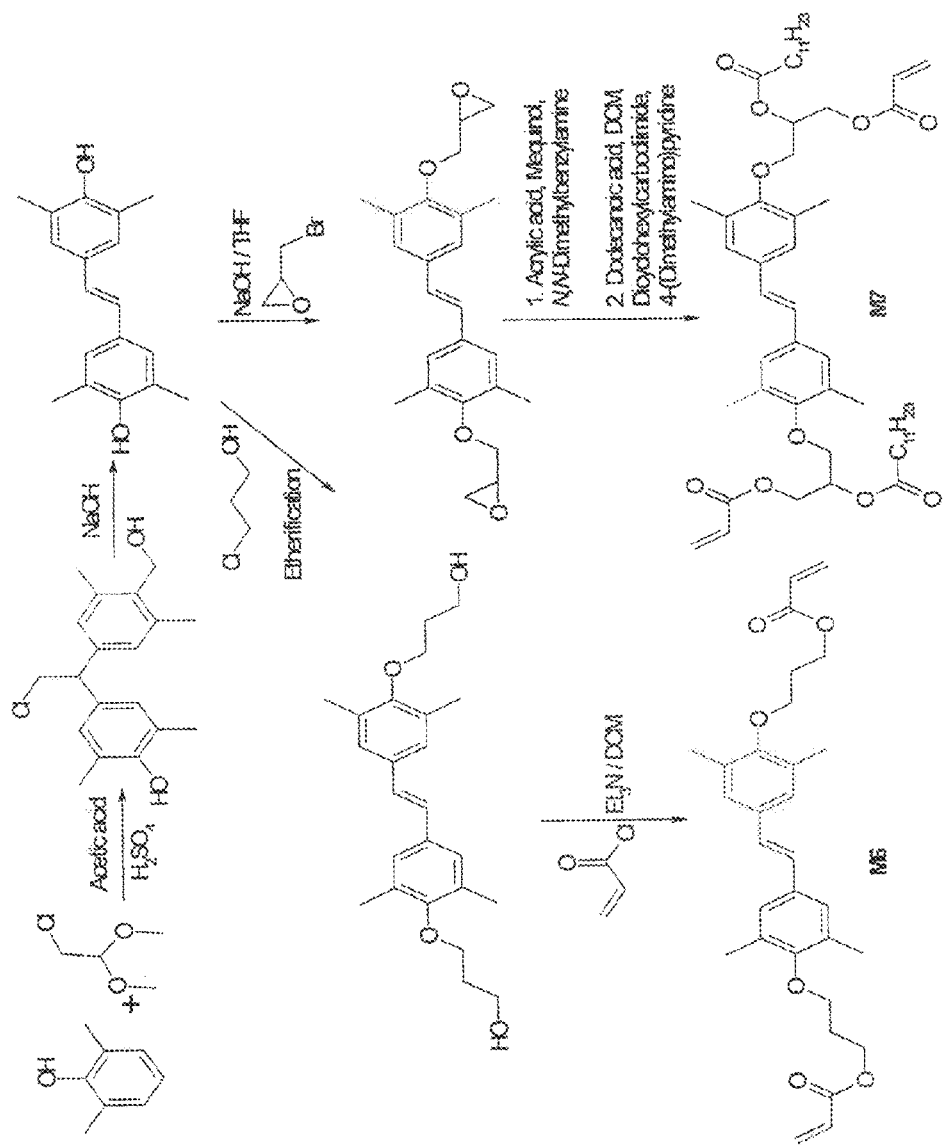
FIG. 10 shows an exemplary synthesis of monomers M6 and M7.
Figure 11:
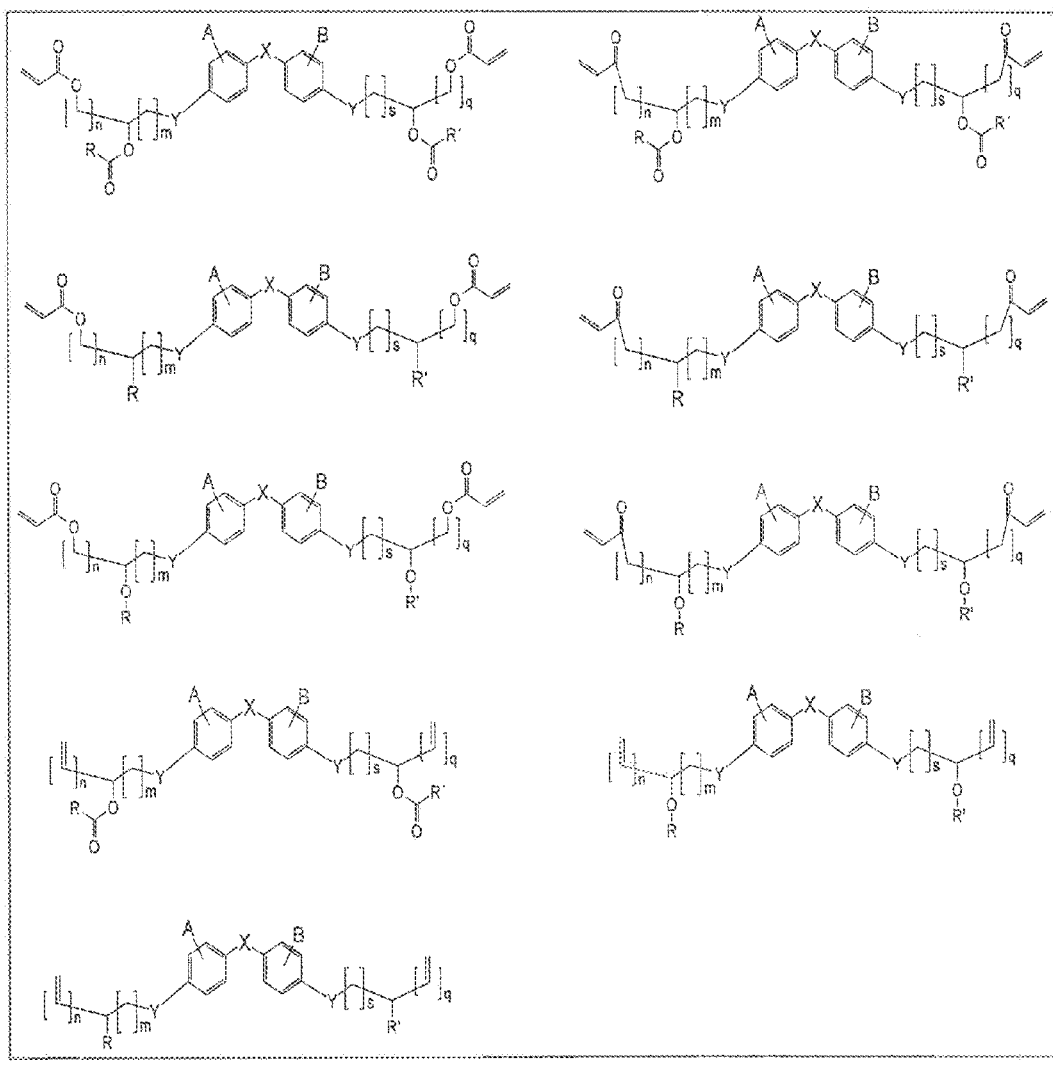
FIG. 11-14 show polymerizable monomers having alkyl side chains in accordance with the
present invention.
Figure 12:
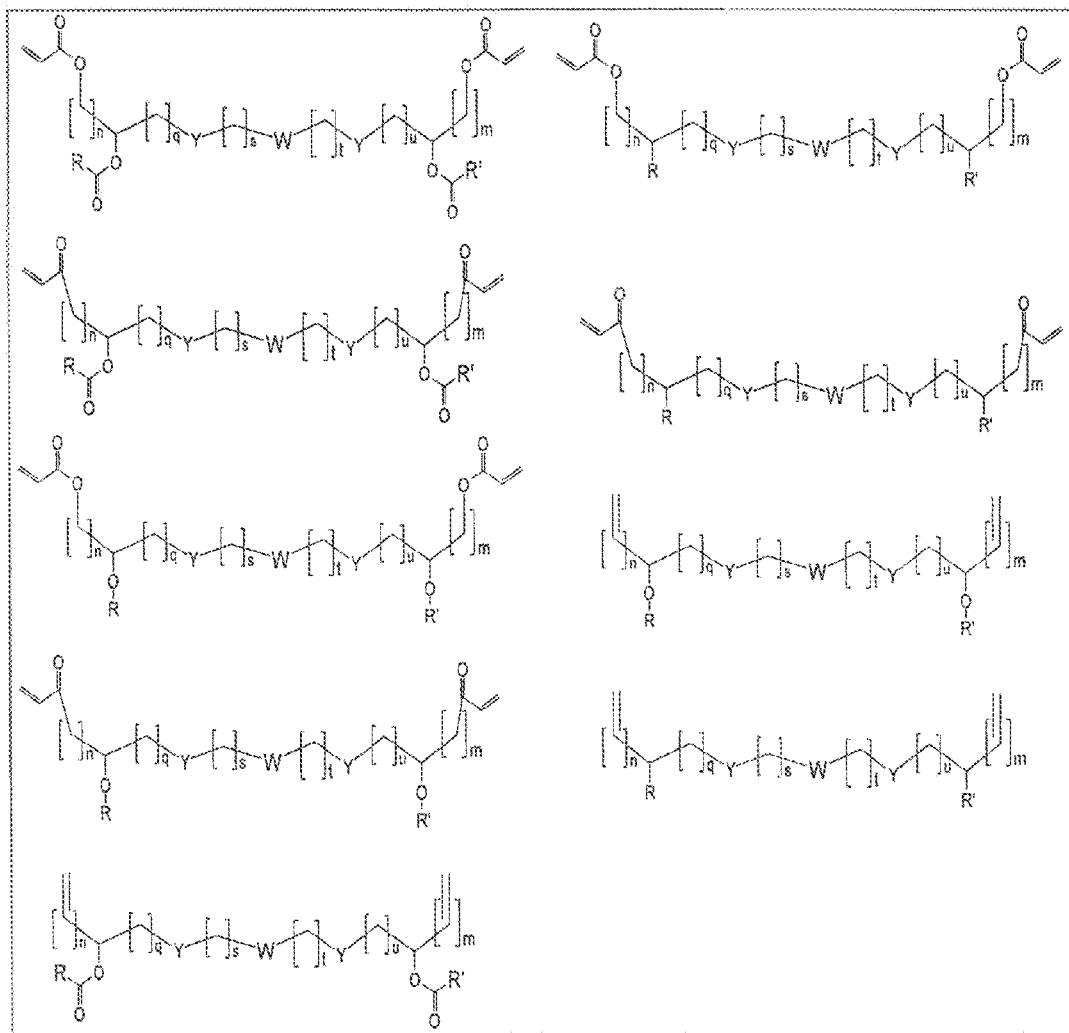
Figure 13:
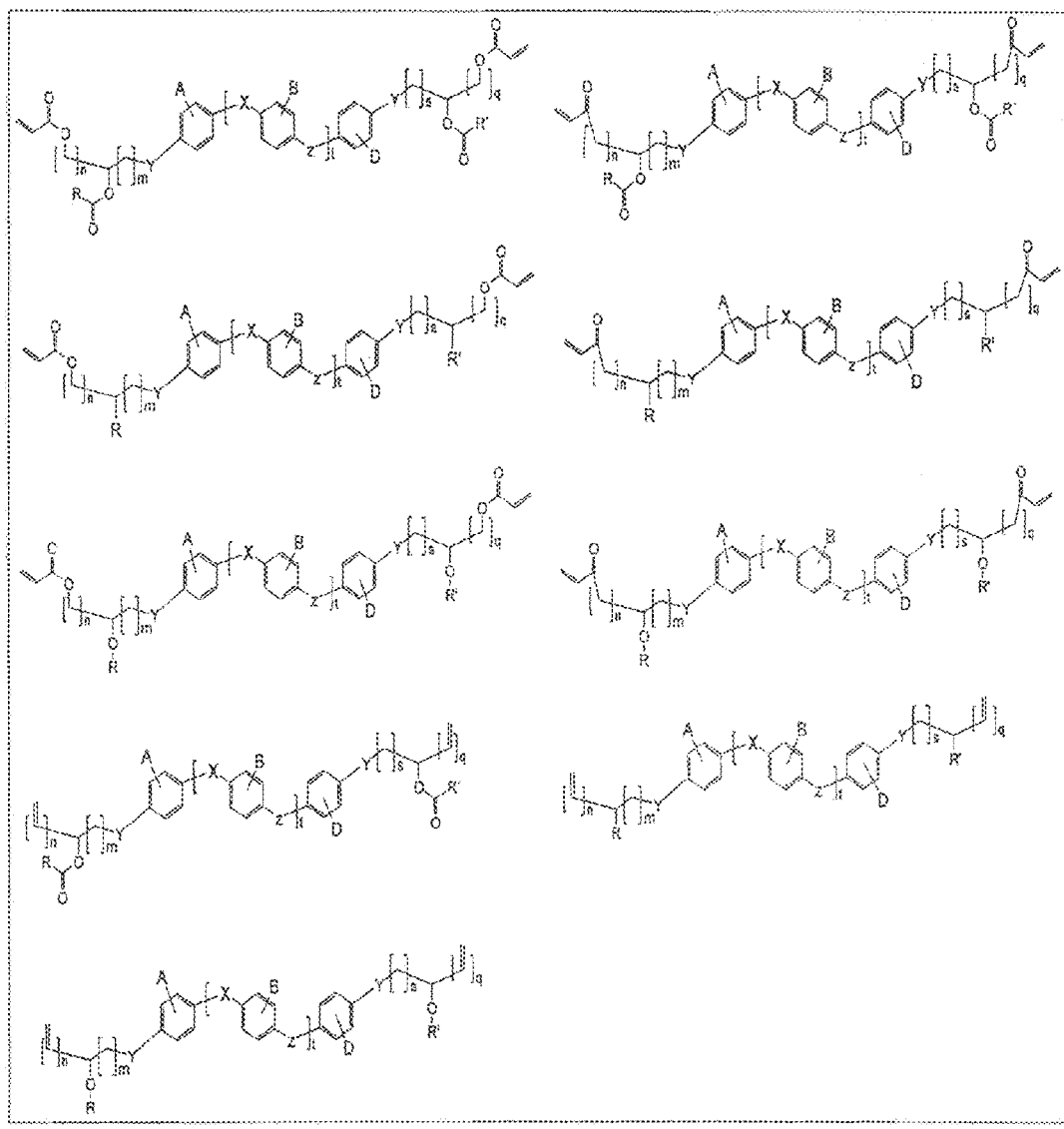
Figure 14:
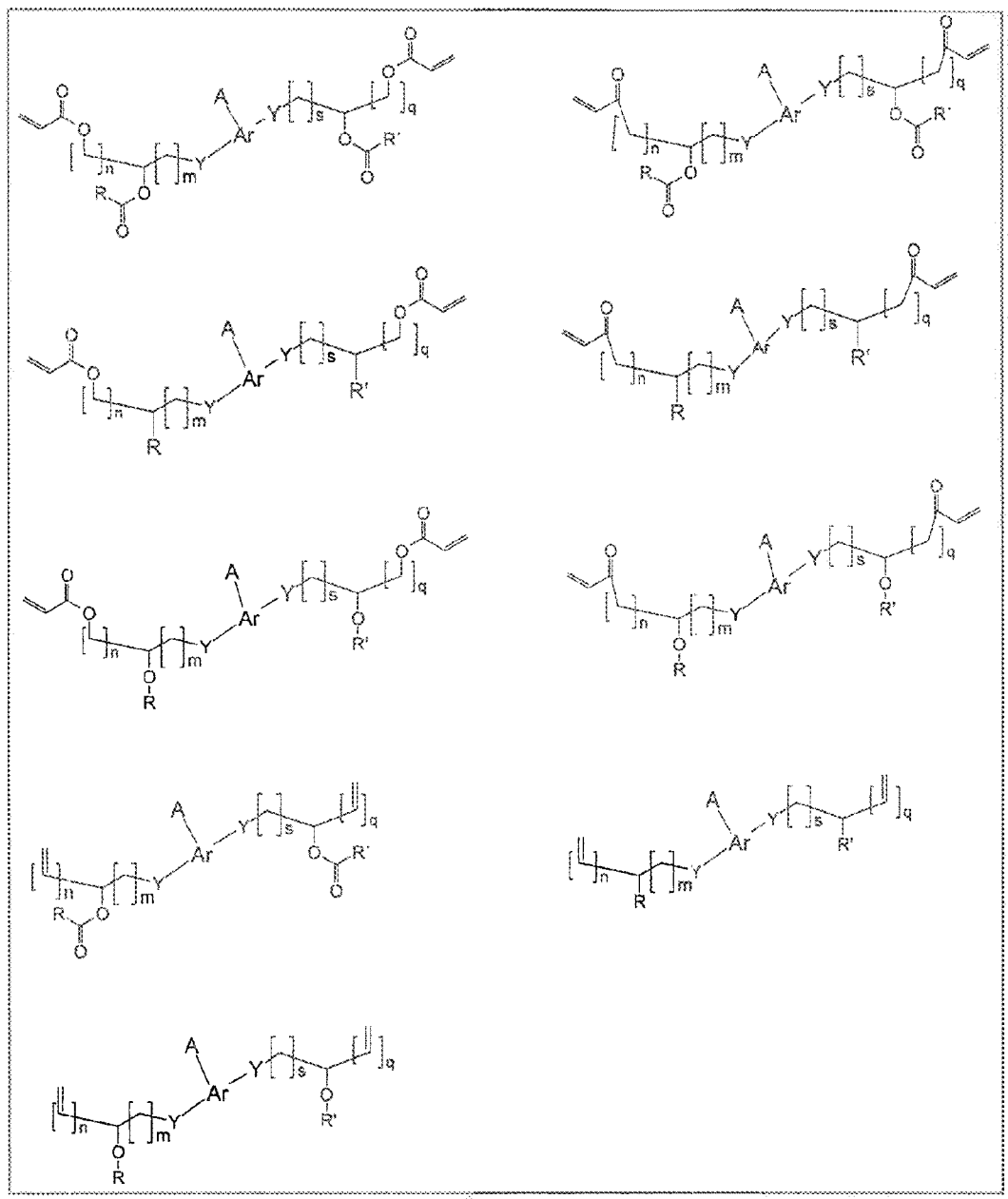

Synthetic scheme for the synthesis of monomer M6 and M7 is given in FIG. 10. To a three neck flask equipped with nitrogen inlet, stirrer and temp. controller, 12.2 g (0.1 mol) of 2,6-dimethyl phenol, 5.7 mL (0.05 mol) chloroacetaldehyde dimethyl acetal and 17.9 mL of acetic acid were added. The reaction mixture was gradually cooled to 5° C. and a mixture of 3.3 mL sulfuric acid in 4.0 mL acetic acid was added gradually in 1 hour, the reaction was warmed to room temp. and maintained at r.t. for another 24 h. After the reaction was completed, it was cooled to 5° C., filtered and the light colored precipitate was washed with water. After drying, the product was recrystallized from xylene to afford white solid (~7.0 g) as tetramethyl dihydroxy chloro intermediate. This intermediate was characterized by its NMR and GC-MS analyses.

Following the synthesis, above obtained intermediate was again dissolved in methanol (20 mL) and maintained at 30° C. and then 6.0 mL of 20 wt % of NaOH was added gradually for 30 min and was heated at reflux for 3 h. When the reaction was complete, 1.0 mL of HCL was added to neutralize the excess NaOH. The solution was concentrated and poured into large amount of water. The precipitate formed was filtered, dried and recrystallized from chloro-benzene to afford the product, tetramethyl dihydroxy stilbene as light brownish solid (~5.0 g). It was characterized through its NMR and GC-MS analyses. Tetramethyl dihydroxy stilbene was then further utilized for the synthesis of monomers M6 and M7.

For the synthesis of M6, a solution of dihydroxy stilbene (2.0 g, 7.5 mmol), 3-chloro-1-propanol and anhydrous potassium carbonate (3.1 g, 22.4 mmol) in 50 mL methyl ethyl ketone (MEK) was refluxed for 24 hours. The reaction mixture was then cooled to room temp. and poured into 50 mL of water. The mixture was extracted twice with 50 mL of dichloromethane. The combined organic phases were dried over magnesium sulfate, filtered and solvent was evaporated to yield light colored sold which was recrystallized from acetone/pentane to afford dihydroxy intermediate as light colored solid (~2.0 g). This intermediate was characterized through its NMR and GC-MS analyses. To a solution of obtained dihydroxy intermediate (1.0 g, 2.60 mmol) and triethylamine (1.1 mL, 7.8 mmol) in 20 mL dichloromethane in an ice bath was added dropwise acryloyl chloride (0.6 mL, 6.5 mmol). After being stirred for 20 min, the reaction mixture was stirred overnight at room temperature. The resulting mixture was poured into water and then extracted with dichloromethane. The extract was washed with brine, dried over magnesium sulfate, filtered and concentrated in vacuo. The residue was purified by column chromatography by eluting with pentane/ethyl acetate (5:1 to 1:1) to afford light coloured solid (0.59 g) melting at 101-103° C. Stilbene based diacrylate monomer M6 was again characterized though it's NMR and GC-MS data.

Procedure for the synthesis of monomer M7 is given as follow. To a three neck round-bottomed flask equipped with a nitrogen inlet, heating bath and temperature controller, 2.0 g (7.5 mmol) of tetramethyl dihydroxy stilbene, 17 mL of THF and 6.9 g (4.4 mL, 50.4 mmol) of epibromohydrin were added. The reaction mixture was controlled at 65° C. and 1.0 mL of 48 wt % NaOH was added gradually in 1 hour and then the mixture was reacted at the same temperature for additional 4 hour. After the reaction was completed, it was added with water and extracted with ether (three times) and once with dichloromethane and the organic layers were combined, dried and evaporated to get crude product. Purification was carried out through a column of silica gel by eluting with pentane/ether (1:1) to afford yellowish solid as epoxide intermediate (0.6 g) which was characterized through its NMR and GC analyses.

In a second step, above epoxide (0.6 g, 1.58 mmol) was taken in a three neck round bottomed flask and acrylic acid (0.32 mL, 4.74 mmol) was added followed by the addition of dimethyl-benzylamine (3.1 mg) and mequinol (8 mg) and the mixture was stirred at 60° C. in an oil bath for 24 hour. After the reaction was completed, it was directly purified through a column of silica gel with pentane/ethyl acetate (1:1) as solvents. Product was isolated as light colored thick liquid (0.5 g). GC-MS analysis did not show any molecular ion peak since it was not stable under given conditions and also probably due to its higher molecular mass it did not pass through GC-column. However, NMR indicated the formation of product.

In a final step to synthesize diacrylate monomer (M7), dicyclohexyl carbodiimide (206 mg, 1.0 mmol) was added to a mixture of above diacrylate (0.5 g, 0.95 mmol), lauric acid (200 mg, 1.0 mmol) and 4-dimethylamino pyridine (4.1 mg, 0.033 mmol) in 10 ml of anhydrous dichloromethane in an ice bath. After addition of the reaction components, mixture was stirred at room temperature for 5 h and the precipitated urea was filtered off and washed with dichloromethane. Solvent was removed under reduced pressure and newly precipitated urea was again filtered off. The solution was washed with 0.5 N HCl, twice with sat. NaHCO$_3$ and dried over MgSO$_4$. Final purification was carried out through a column of silica gel with pentane/ethyl acetate (1:1) as solvents to afford M7 as a white solid (~350 mg) melting above room temperature. Due to higher molecular weight and instability, GC-MS could not be obtained. However, structure was confirmed by its NMR data.

Example 2

Comparison Between Crosslinking Monomers with and without Alkyl Side Chains

A typical procedure to prepare a test display panel using an acryl reactive monomer with or without alkyl side chain is as such: A cell comprising of two stuck-together glass substrates with ITO electrodes, where at least one substrate is coated with interdigitated ITO-electrode, is filled with the HPLC mixture by capillary filling. The HPLC mixture contains one or several liquid crystals, chiral dopant, photo initiator, one or more monomers for polymerizing (cross-linking) with and without alkyl side chains and one or more for end-capping.

The cell is heated with heating stage (Linkam LTS350) to isotropic phase and cooled down afterwards with the help of liquid nitrogen (Linkam LNP) at a rate of 0.1° C./minute. During the cooling process blue phase is detected. The device is kept at the specific temperature where BP occurs and UV light of 1.5 mW/cm$^2$ (Hamamatsu) is shone onto the cell for 20 minutes. The cell is allowed to cool down to room temperature and is than ready for measurement of BP temperature range and EO properties.

Example for HPLC Mixture:
A mixture used for stabilization of BP with wide temperature range contained the following: 45 mol % LC-mixture JC-1041XX, 44 mol % LC 5CB, 4.50 mol % Chiral Dopant ZLI-4572, 2.6 mol % reactive monomer RM257, 2.0 mol % acrylic EHA (monomer for end-capping), 1.0 mol % of M4 (alkyl side chain monomer), 0.50 mol % Photoinitiator DMPAP.

Using the above mentioned mixture with monomer having alkyl side chain, before UV curing the BP mixture showed a stable temperature range between 45.4-47.9° C. while after the BPLCs mixture and monomer with alkyl side chain were stabilized by UV curing the final stability temperature that was achieved was >0° C.-52° C. These results show very successfully that the newly formed polymer was incorporated into and around the disclination or defects present in the cubic structure of the BP. The above measurement was repeated by replacing the M4 with reactive monomer without alkyl side chain (monomer M3) and results were compared.

Figure 3:
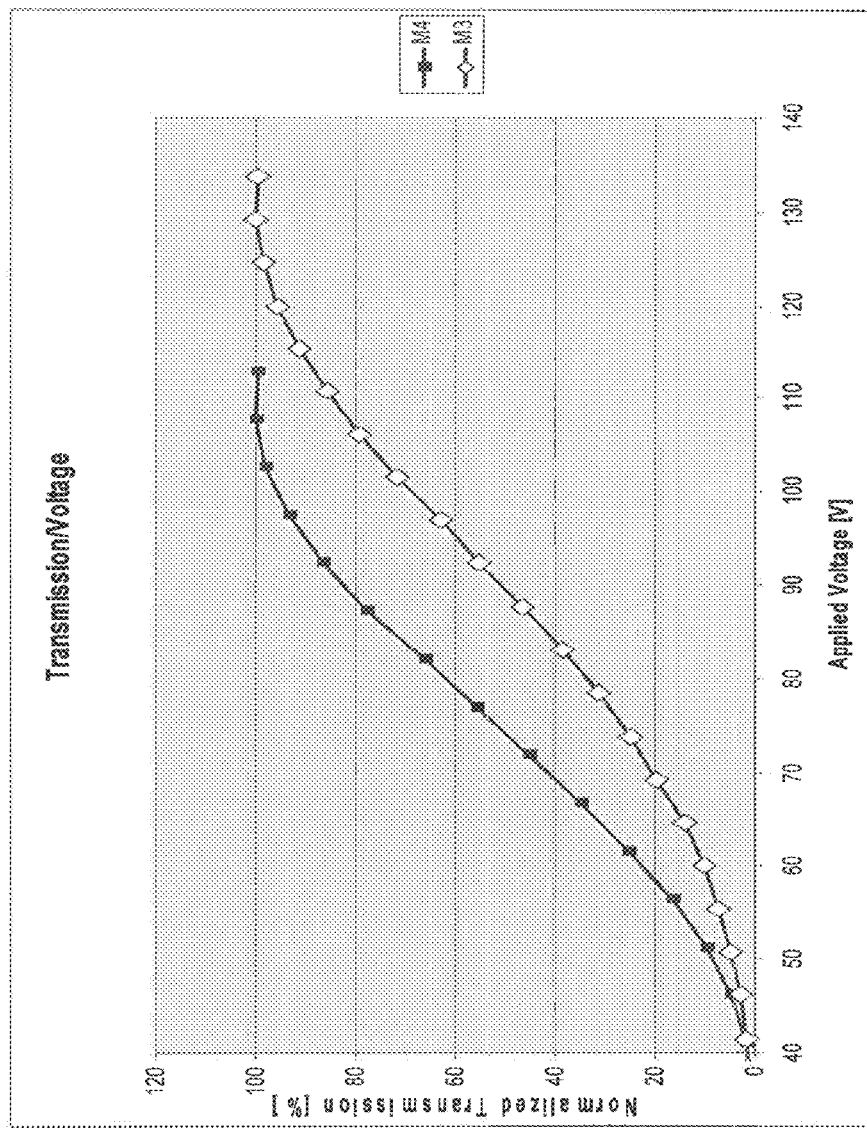
FIG. 3 shows a voltage-transmission curve of a polymer-stabilized blue phase liquid crystal
composition including compound M3 and M4, with a V90 of 109V and 83V, respectively, V90 denoting the voltage at which 90% transmission are achieved.

The switching behaviour of the above mentioned stabilized BPs is shown in FIG. 3. FIG. 3 shows the switching behaviour of system containing M3 (without alkyl side chain) and M4 (with alkyl side chain). It is evident from both data that a decrease of operating voltage of 25V was achieved in the system with M4 which is a clear evidence for the potentiality of alkyl side chain reducing the operating voltage.

Figure 4:
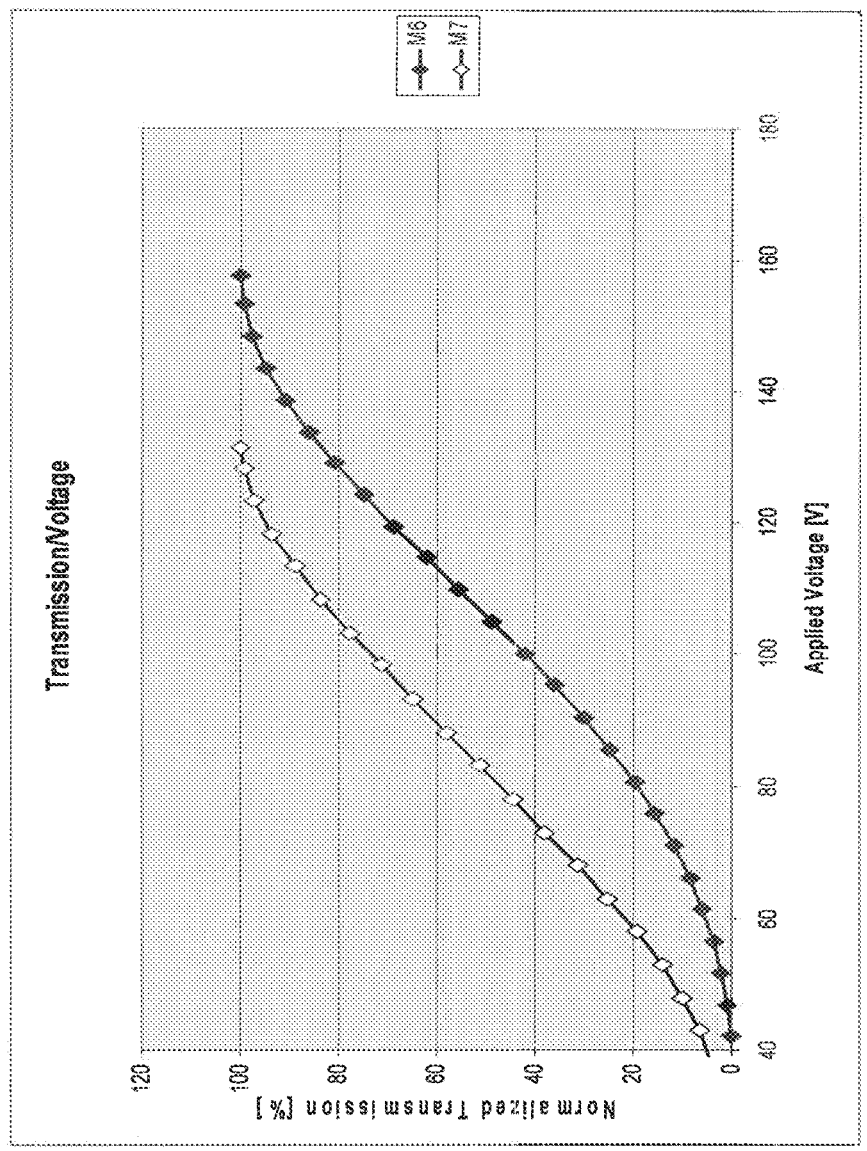
FIG. 4 shows a voltage-transmission curve of a polymer-stabilized blue phase liquid crystal
composition including compounds M6 and M7 with the V90 values being 138V and 114V,
respectively.

Similarly by employing all the above experimental conditions but by replacing M4 and M3 with M7 and M6 respectively, next tests series were carried out in order to further testify the effectiveness of having long alkyl chains on the polymer back-bone as mentioned in case of M4 and M3. It is worth mentioning that similar trend for the reduction of operating voltage has been measured for the monomer with alkyl side chain i.e. M7 compared to monomer without alkyl side chain i.e. M6. In case of M7 a decrease of operating voltage of 24V was achieved for the BP system compared to the similar system with M6. The switching behaviour of stabilized BP system containing M7 and M6 is shown in FIG. 4.

Figure 5:
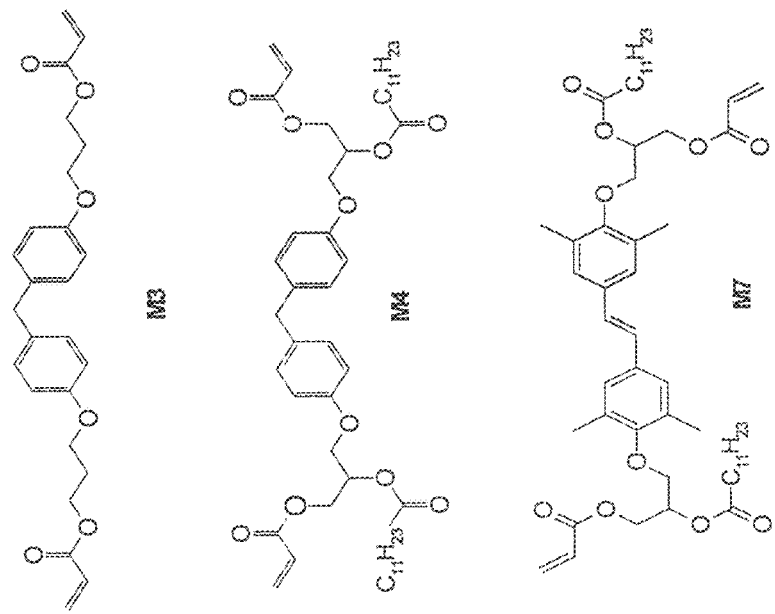
FIG. 5 shows the chemical structures of reactive monomers MI-M7 with and without alkyl
side chains.
Figure 5:
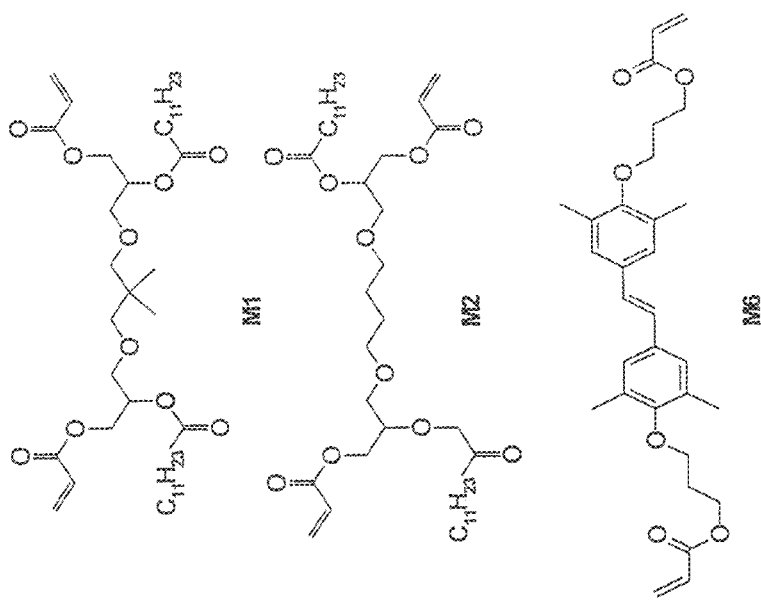

The structures of the reactive monomers with and without alkyl side chains are given in the FIG. 5.

The syntheses of some key reactive monomers are given in the FIGS. 6-10. Some further monomers in accordance with the present invention are given in FIGS. 11-14.

The features of the present invention disclosed in the specification, the claims and/or in the accompanying drawings, may, both separately, in an any combination thereof the material for realizing the invention in various forms thereof.

The invention claimed is:

1. A liquid crystal composition, comprising in polymerized form:
a liquid crystal material capable of forming a blue phase; and
at least one crosslinking monomer comprising at least one pendant group of formula (A):

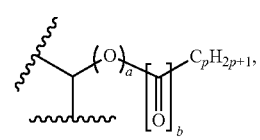

(A)

wherein:
a represents an integer 0 or 1;
b represents an integer 0 or a; and
p represents an integer from 3 to 20.

2. The liquid crystal composition according to claim 1, wherein said composition further comprises an endcapping monomer.

3. The liquid crystal composition according to claim 2, wherein the endcapping monomer comprises an alkyl chain having the formula:

$C_pH_{2p+1}$, wherein p represents an integer from 7 to 20.

4. The liquid crystal composition according to claim 1, wherein the at least one crosslinking monomer is at least one selected from the group consisting of:

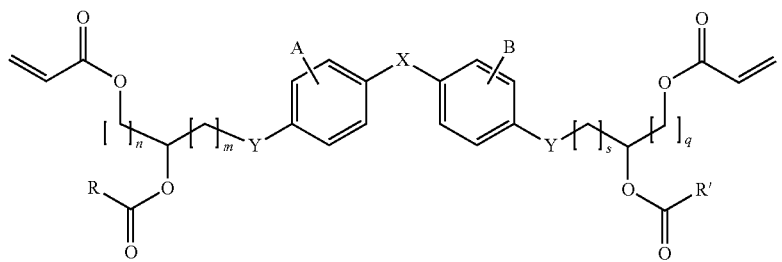
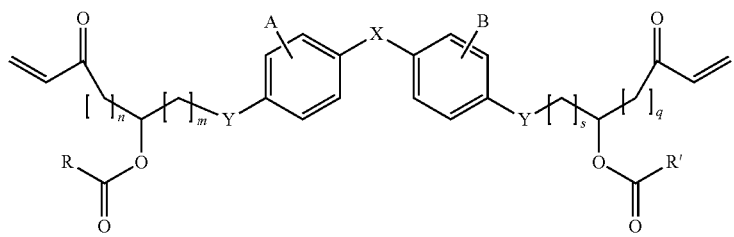
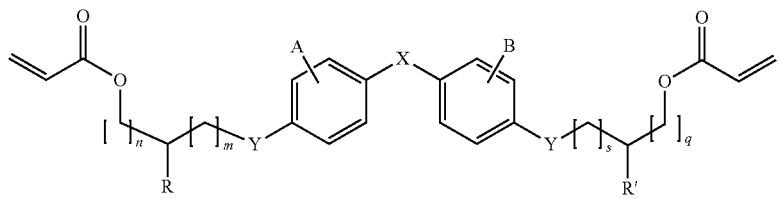
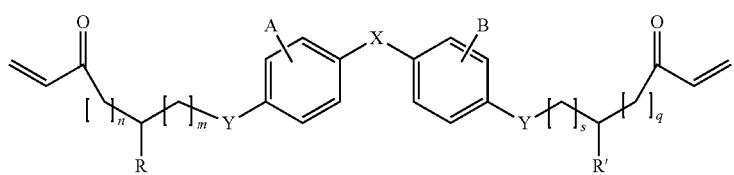
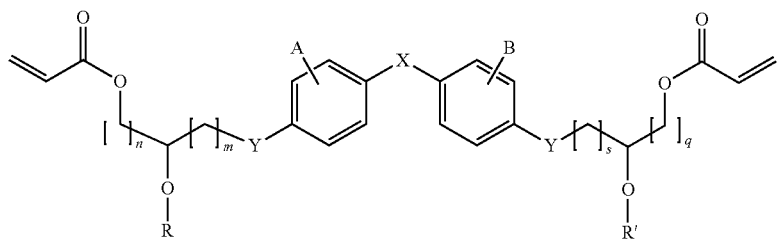
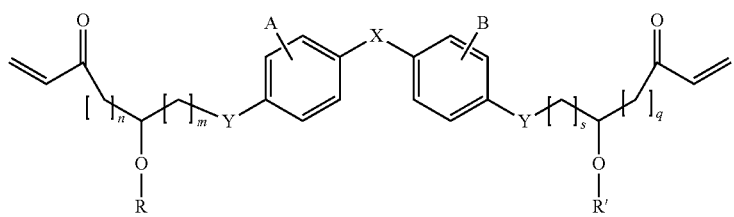
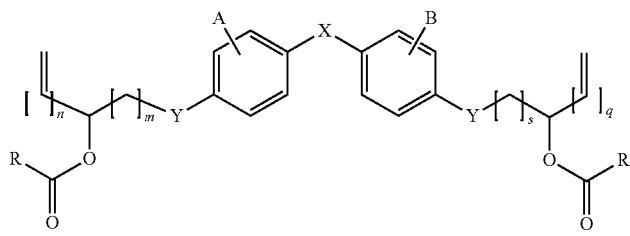

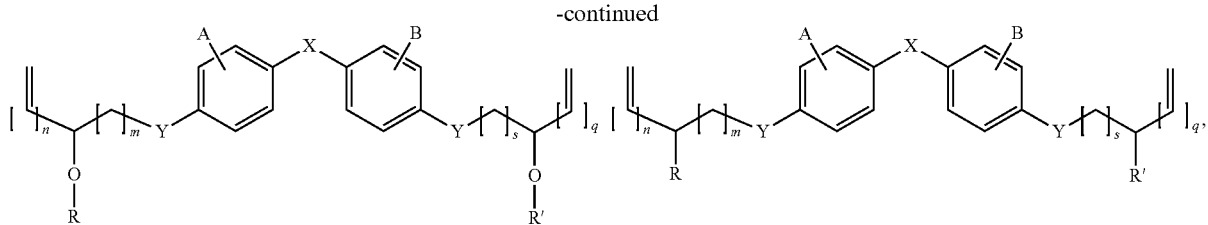

wherein:
X represents a $C_tH_{2t}$ group, O, S, a NR" group, $C(CF_3)_2$, CHF, $CF_2$, a $C(C_rH_{2r})_2$ group, —C(O)O, C(O), OC(O)O, an aromatic ring-containing group, a 5 or 6 membered heteroaromatic ring-containing group, or a —$CR_a$=$CR_b$— group;
Ra and Rb independently represent H, a $C_rH_{2r+1}$ group, F, Cl, CN, $CF_3$, an ester group, or —C≡C—;
t represents an integer from 0 to 20;
R and R' independently represent a $C_pH_{2p+1}$ group;
p represents an integer from 3 to 20;
n represents an integer from 0 to 20;
m represents an integer form 0 to 20;
s represents an integer from 0 to 20;
q represents an integer from 0 to 20;
Y represents $CH_2$, O, C(O)O, OC(O), OC(O)O, S, NH, or an NR" group;
A and B independently represent H, a $C_rH_{2r+1}$ group, F, Cl, Br, CN, $CF_3$, OH;
R" represents H or a $C_rH_{2r+1}$; and
r independently represents an integer from 1 to 20;

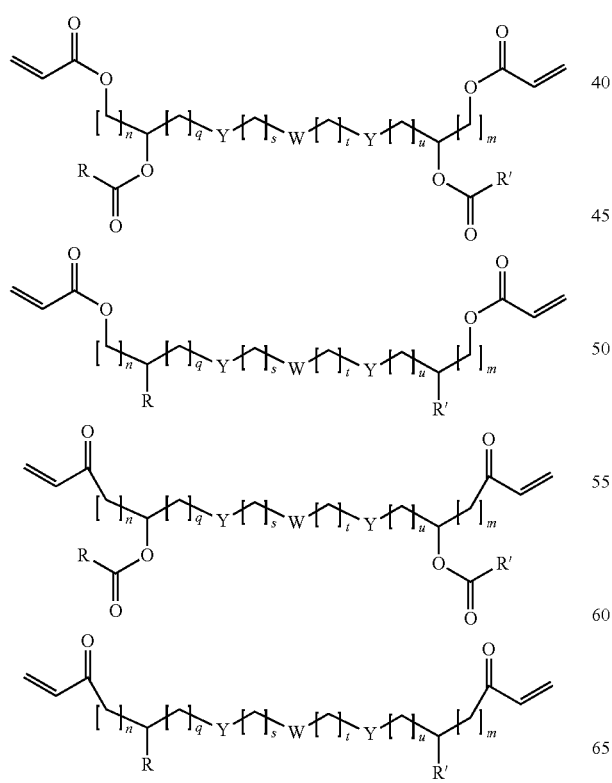

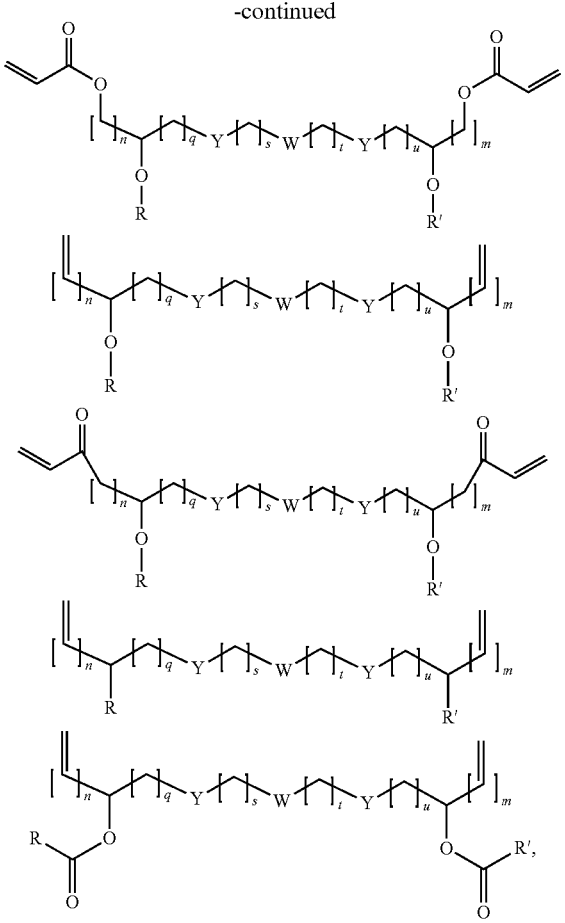

wherein:
W represents a $C_zH_{2z}$ group, O, S, a NR" group, $C(CF_3)_2$, CHF, $CF_2$, a $C(C_rH_{2r})_2$ group, —C(O)O, C(O), OC(O)O, an aromatic ring-containing group, a 5 or 6 membered heteroaromatic ring-containing group, or a —$CR_a$=$CR_b$— group;
Ra and Rb independently represent H, a $C_rH_{2r+1}$ group, F, Cl, CN, $CF_3$, an ester group, and or —C≡C—;
z represents an integer from 0 to 20;
R and R' independently represent a $C_pH_{2p+1}$ group;
p represents an integer from 3 to 20;
n represents an integer from 0 to 20;
m represents an integer from 0 to 20;
s represents an integer from 0 to 20;
q represents an integer from 0 to 20;
t represents an integer from 0 to 20;
u represents an integer from 0 to 20;
Y independently represents $CH_2$, O, C(O)O, OC(O), OC(O)O, S, NH, or an NR" group;
R" independently represents H or a $C_rH_{2r+1}$ group; and
r represents an integer from 1 to 20;

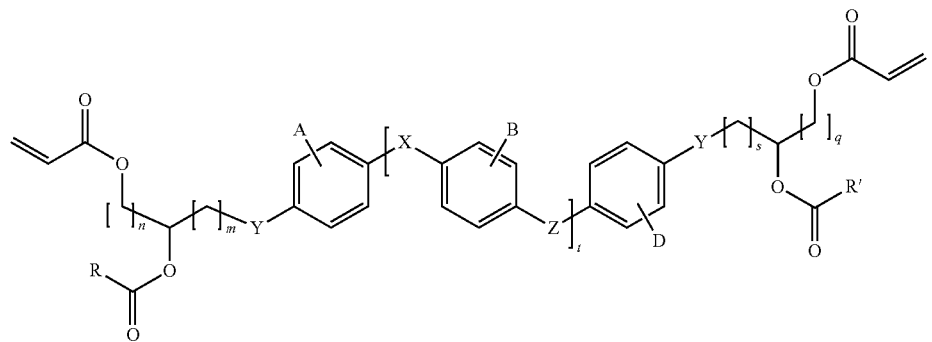
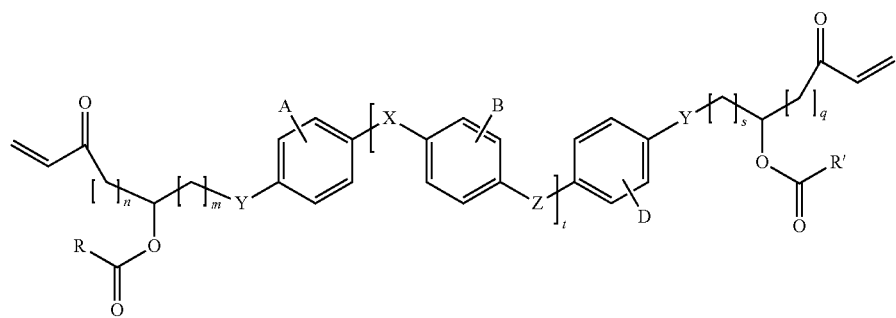
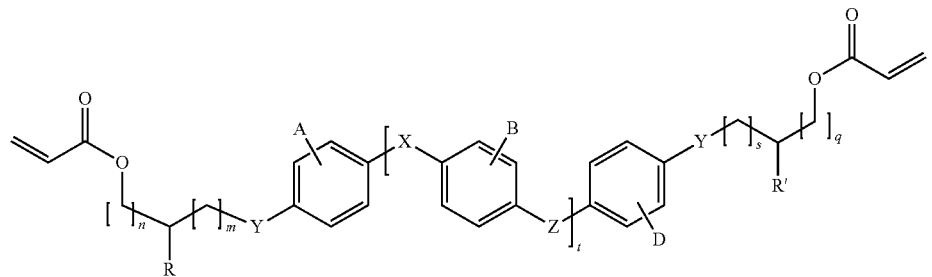
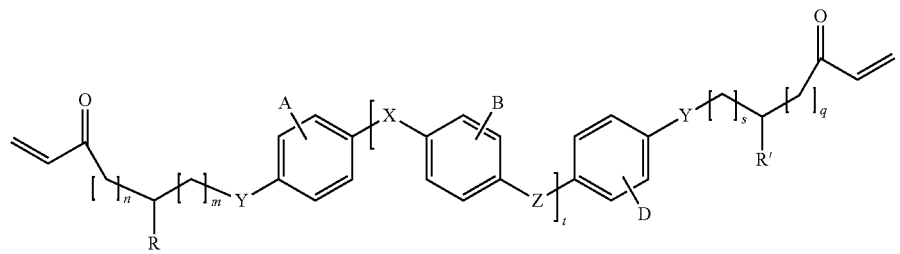
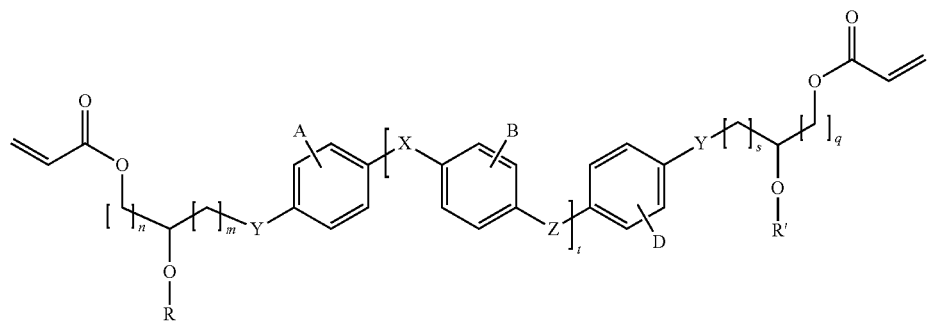

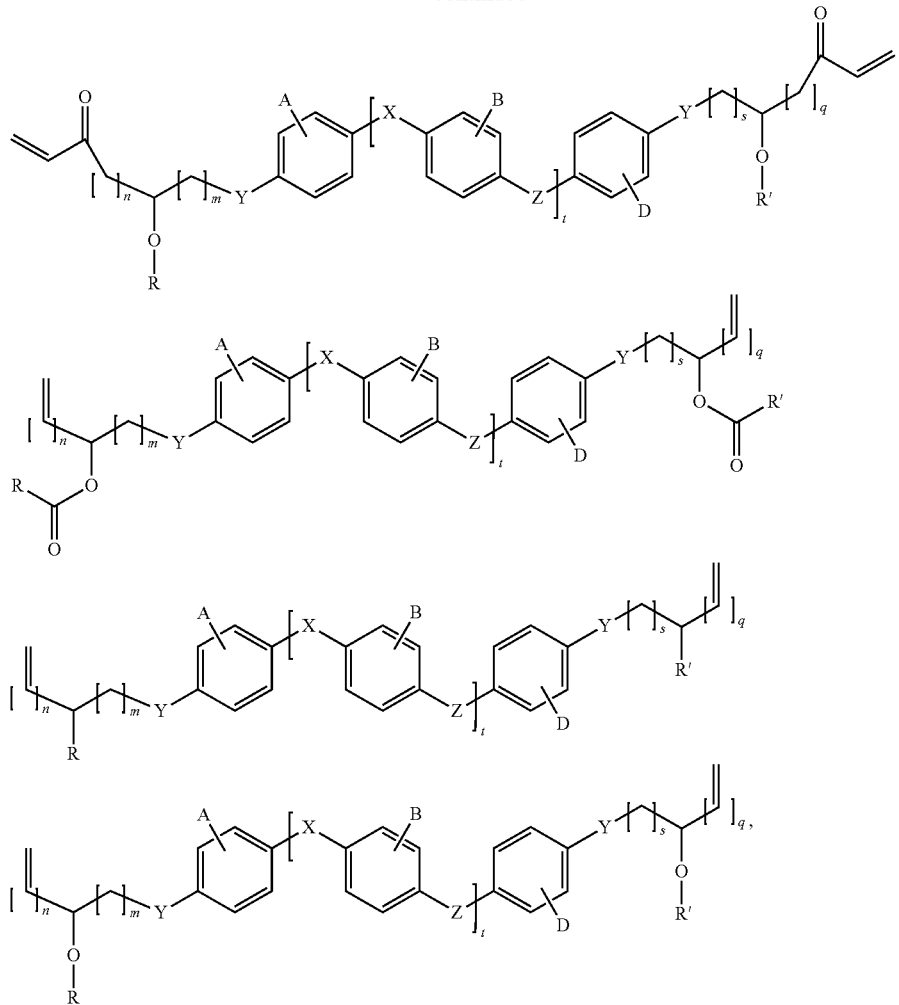

wherein:

X and Z independently represent a $C_yH_{2y}$ group, O, S, a NR" group, $C(CF_3)_2$, CHF, $CF_2$, a $C(C_rH_{2r})_2$ group, —C(O)O, C(O), OC(O)O, an aromatic ring-containing group, a 5 or 6 membered heteroaromatic ring-containing group, or a —$CR_a$=$CR_b$— group;

Ra and Rb independently represent H, a $C_rH_{2r+1}$ group, F, Cl, CN, $CF_3$, an ester group, and —C=C—;

y represents an integer from 0 to 20;

R and R' independently represent a $C_pH_{2p+1}$ group;

p represents an integer form 3 to 20;

n represents an integer from 0 to 20;

m represents an integer form 0 to 20;

s represents an integer from 0 to 20;

q represents an integer from 0 to 20;

t represents an integer from 0 to 20;

Y independently represents $CH_2$, O, C(O)O, OC(O), OC(O)O, S, NH, or an NR" group;

A, B and D independently represent H, a $C_rH_{2r+1}$, F, Cl, Br, CN, $CF_3$, or OH;

R" independently represents H or a $C_rH_{2r+1}$ group; and r represents an integer from 1 to 20; and

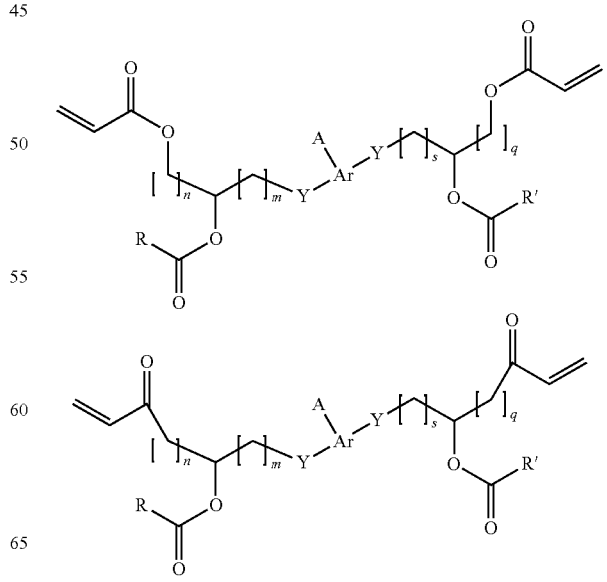

-continued

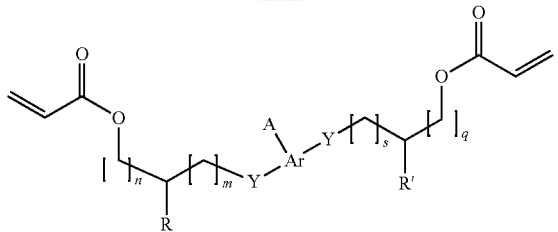

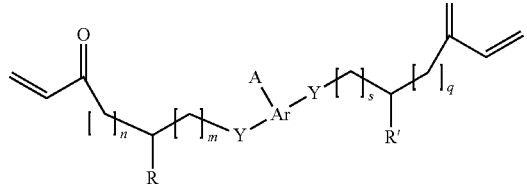

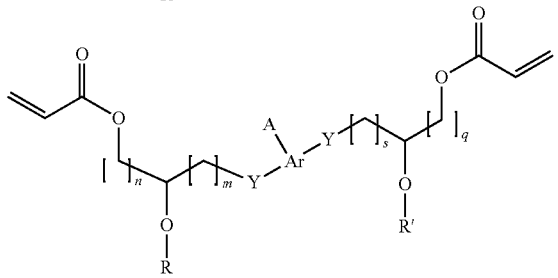

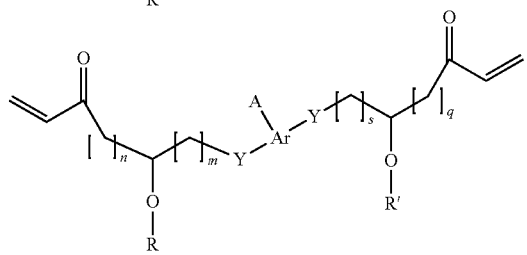

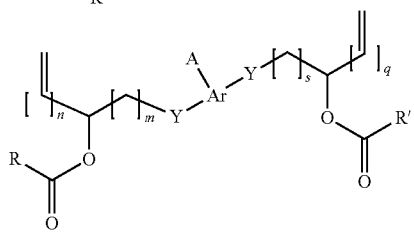

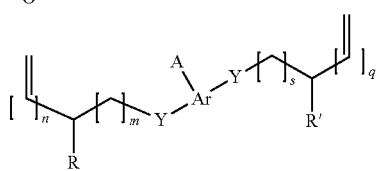

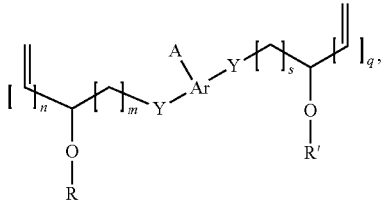

wherein:
Ar represents an aromatic ring-containing group, or a 5 or 6 membered heteroaromatic ring-containing group;
R and R' independently represent a $C_pH_{2p+1}$ group;
p represents an integer from 3 to 20;
n represents an integer from 0 to 20;
m represents an integer from 0 to 20;
s represents an integer from 0 to 20;
q represents an integer from 0 to 20;
Y represents $CH_2$, O, C(O)O, OC(O), OC(O)O, S, NH, or an NR" group;
R" represents H or a $C_rH_{2r+1}$ group;
A represents H, a $C_rH_{2r+1}$ group, F, Cl, S, N, $CF_3$, or OH and is attached to any carbon atom on the aromatic ring Ar; and
r independently represents an integer from 1 to 20.

5. The liquid crystal composition according to claim 4, wherein the at least one crosslinking monomer is selected from the group consisting of:

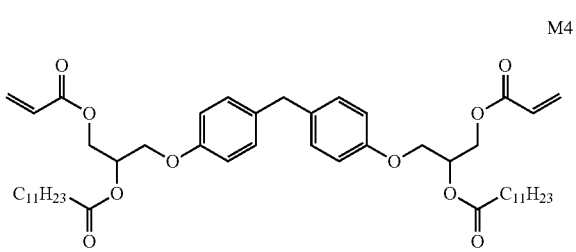

M4 and,

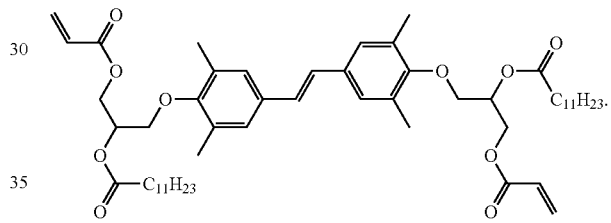

M7

6. The liquid crystal composition according to claim 1, wherein the liquid crystal material capable of forming a blue phase is a mixture of liquid crystal compounds.

7. The liquid crystal composition according to claim 6, wherein the at least one crosslinking monomer further comprises polymerizable groups selected from the group consisting of diacrylate groups and divinyl groups.

8. A method, comprising:
adding at least one crosslinking monomer comprising at least one pendant group of formula (A):

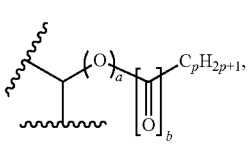

(A)

to a liquid crystal material capable of forming a blue phase; and
polymerizing the at least one crosslinking monomer to form a liquid crystal composition such that the liquid crystal material exists in a blue phase state,
wherein:
a represents an integer 0 or 1;
b represents an integer 0 or a; and
p represents an integer from 3 to 20.

9. A blue phase liquid crystal composition stabilized by the method of claim 8.

10. A liquid crystal cell, comprising the blue phase liquid crystal composition according to claim 9.

11. A liquid crystal display, comprising the blue phase liquid crystal composition according to claim 9.

12. The method according to claim 8, further comprising adding at least one monomer for endcapping to the liquid crystal material capable of forming a blue phase, wherein the at least one crosslinking monomer and the at least one endcapping monomer are polymerized to form the liquid crystal composition such that the liquid crystal material exists in a blue phase state.

13. The method according to claim 8, which is suitable for at least one selected from the group consisting of stabilizing the blue phase state of the liquid crystal material, broadening a temperature range over which the blue phase state of the liquid crystal material is stable, and lowering an operating voltage of the liquid crystal material.

14. The method according to claim 12, which is suitable for at least one selected from the group consisting of stabilizing the blue phase state of the liquid crystal material, broadening a temperature range over which the blue phase state of the liquid crystal material is stable, and lowering an operating voltage of the liquid crystal material.

15. A blue phase liquid crystal having a stability temperature range which has been broadened by the method of claim 8.

16. A blue phase liquid crystal having an operating voltage that is lowered by the method of claim 8.

17. A liquid crystal display, comprising the liquid crystal cell according to claim 10.

18. The liquid crystal composition according to claim 1, wherein the crosslinking monomer further comprises at least one moiety selected from the group consisting of formulas (B)-(E):

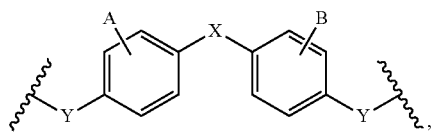
(B)

wherein:

X represents a $C_tH_{2t}$ group, O, S, a NR" group, $C(CF_3)_2$, CHF, $CF_2$, a $C(C_rH_{2r})_2$ group, —C(O)O, C(O), OC(O)O, an aromatic ring-containing group, a 5 or 6 membered heteroaromatic ring-containing group, or a —$CR_a$=$CR_b$— group;

Ra and Rb independently represent H, a $C_rH_{2r+1}$ group, F, Cl, CN, $CF_3$, an ester group, or —C≡C—;

t represents an integer from 0 to 20;

Y represents $CH_2$, O, C(O)O, OC(O), OC(O)O, S, NH, or an NR"group; A and B independently represent H, a $C_rH_{2r+1}$ group, F, Cl, Br, CN, $CF_3$, OH;

R" represents H or a $C_rH_{2r+1}$; and r independently represents an integer from 1 to 20;

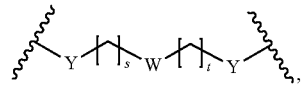
(C)

wherein:

W represents a $C_zH_{2z}$ group, O, S, a NR" group, $C(CF_3)_2$, CHF, $CF_2$, a $C(C_rH_{2r})_2$ group, —C(O)O, C(O), OC(O)O, an aromatic ring-containing group, a 5 or 6 membered heteroaromatic ring-containing group, or a —$CR_a$=$CR_b$— group;

Ra and Rb independently represent H, a $C_rH_{2r+1}$ group, F, Cl, CN, $CF_3$, an ester group, and or —C≡C—;

z represents an integer from 0 to 20;

s represents an integer from 0 to 20;

t represents an integer from 0 to 20;

Y independently represents C(O)O, OC(O), OC(O)O, S, NH, or an NR"group;

R" independently represents H or a $C_rH_{2r+1}$ group; and r represents an integer from 1 to 20;

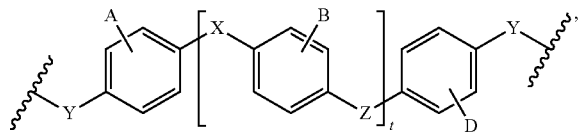
(D)

wherein:

X and Z independently represent a $C_yH_{2y}$ group, O, S, a NR" group, $C(CF_3)_2$, CHF, $CF_2$, a $C(C_rH_{2r})_2$ group, —C(O)O, C(O), OC(O)O, an aromatic ring-containing group, a 5 or 6 membered heteroaromatic ring-containing group, or a —$CR_a$=$CR_b$— group;

Ra and Rb independently represent H, a $C_rH_{2r+1}$ group, F, Cl, CN, $CF_3$, an ester group, and —C≡C—;

y represents an integer from 0 to 20;

t represents an integer from 0 to 20;

Y independently represents $CH_2$, O, C(O)O, OC(O), OC(O)O, S, NH, or an NR" group;

A, B and D independently represent H, a $C_rH_{2r+1}$, F, Cl, Br, CN, $CF_3$, or OH;

R" independently represents H or a $C_rH_{2r+1}$ group; and r represents an integer from 1 to 20; and

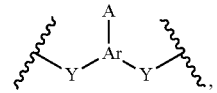
(E)

wherein:

Ar represents an aromatic ring-containing group, or a 5 or 6 membered heteroaromatic ring-containing group; R and R' independently represent a $C_pH_{2p+1}$ group;

p represents an integer from 3 to 20;

Y represents $CH_2$, O, C(O)O, OC(O), OC(O)O, S, NH, or an NR" group;

R" represents H or a $C_rH_{2r+1}$ group;

A represents H, a $C_rH_{2r+1}$ group, F, Cl, S, N, $CF_3$, or OH and is attached to any carbon atom on the aromatic ring Ar; and r independently represents an integer from 1 to 20.

19. The method according to claim 8, wherein the crosslinking monomer further comprises at least one moiety selected from the group consisting of formulas (B)-(E):

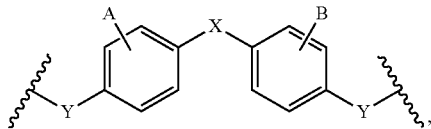 (B)

wherein:
X represents a $C_tH_{2t}$ group, O, S, a NR" group, $C(CF_3)_2$, CHF, $CF_2$, a $C(C_rH_{2r})_2$ group, —C(O)O, C(O), OC(O)O, an aromatic ring-containing group, a 5 or 6 membered heteroaromatic ring-containing group, or a —$CR_a$=$CR_b$— group;
Ra and Rb independently represent H, a $C_rH_{2r+1}$ group, F, Cl, CN, $CF_3$, an ester group, or —C≡C—;
t represents an integer from 0 to 20;
Y represents $CH_2$, O, C(O)O, OC(O), OC(O)O, S, NH, or an NR"group; A and B independently represent H, a $C_rH_{2r+1}$ group, F, Cl, Br, CN, $CF_3$, OH;
R" represents H or a $C_rH_{2r+1}$; and
r independently represents an integer from 1 to 20;

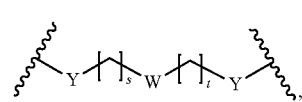 (C)

wherein:
W represents a $C_zH_{2z}$ group, O, S, a NR" group, $C(CF_3)_2$, CHF, $CF_2$, a $C(C_rH_{2r})_2$ group, —C(O)O, C(O), OC(O)O, an aromatic ring-containing group, a 5 or 6 membered heteroaromatic ring-containing group, or a —$CR_a$=$CR_b$— group;
Ra and Rb independently represent H, a $C_rH_{2r+1}$ group, F, Cl, CN, $CF_3$, an ester group, and or —C≡C—;
z represents an integer from 0 to 20;
s represents an integer from 0 to 20;
t represents an integer from 0 to 20;
Y independently represents C(O)O, OC(O), OC(O)O, S, NH, or an NR"group;

R" independently represents H or a $C_rH_{2r+1}$ group; and
r represents an integer from 1 to 20;

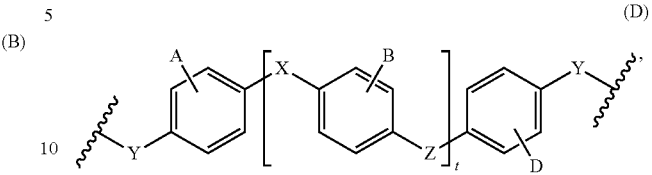 (D)

wherein:
X and Z independently represent a $C_yH_{2y}$ group, O, S, a NR" group, $C(CF_3)_2$, CHF, $CF_2$, a $C(C_rH_{2r})_2$ group, —C(O)O, C(O), OC(O)O, an aromatic ring-containing group, a 5 or 6 membered heteroaromatic ring-containing group, or a —$CR_a$=$CR_b$— group;
Ra and Rb independently represent H, a $C_rH_{2r+1}$ group, F, Cl, CN, $CF_3$, an ester group, and —C≡C—;
y represents an integer from 0 to 20;
t represents an integer from 0 to 20;
Y independently represents $CH_2$, O, C(O)O, OC(O), OC(O)O, S, NH, or an NR" group;
A, B and D independently represent H, a $C_rH_{2r+1}$, F, Cl, Br, CN, $CF_3$, or OH;
R" independently represents H or a $C_rH_{2r+1}$ group; and
r represents an integer from 1 to 20; and

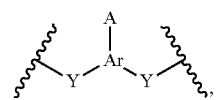 (E)

wherein:
Ar represents an aromatic ring-containing group, or a 5 or 6 membered heteroaromatic ring-containing group; R and R' independently represent a $C_pH_{2p+1}$ group;
p represents an integer from 3 to 20;
Y represents $CH_2$, O, C(O)O, OC(O), OC(O)O, S, NH, or an NR" group;
R" represents H or a $C_rH_{2r+1}$ group;
A represents H, a $C_rH_{2r+1}$ group, F, Cl, S, N, $CF_3$, or OH and is attached to any carbon atom on the aromatic ring Ar; and
r independently represents an integer from 1 to 20.

* * * * *